US011451883B2

(12) United States Patent
Huske et al.

(10) Patent No.: US 11,451,883 B2
(45) Date of Patent: *Sep. 20, 2022

(54) METHOD OF AND SYSTEM FOR MANAGING CLIENT RESOURCES AND ASSETS FOR ACTIVITIES ON COMPUTING DEVICES

(71) Applicant: Winview, Inc., Redwood City, CA (US)

(72) Inventors: Tim Huske, Sunnyvale, CA (US); Mark J. Micheli, San Francisco, CA (US); Mark K. Berner, Santa Clara, CA (US); Matt Ford, San Mateo, CA (US); David B. Lockton, Redwood City, CA (US)

(73) Assignee: Winview, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/893,180

(22) Filed: Jun. 4, 2020

(65) Prior Publication Data

US 2020/0314506 A1 Oct. 1, 2020

Related U.S. Application Data

(63) Continuation of application No. 16/216,885, filed on Dec. 11, 2018, now Pat. No. 10,721,543, which is a (Continued)

(51) Int. Cl.
*H04N 21/81* (2011.01)
*H04N 21/478* (2011.01)
(Continued)

(52) U.S. Cl.
CPC ......... *H04N 21/8173* (2013.01); *H04L 67/01* (2022.05); *H04L 67/52* (2022.05);
(Continued)

(58) Field of Classification Search
CPC ........... H04N 21/8173; H04N 21/2187; H04N 21/41407; H04N 21/4307; H04N 21/442;
(Continued)

(56) References Cited

U.S. PATENT DOCUMENTS 2,831,105 A 4/1958 Parker
3,562,650 A 2/1971 Gossard et al.
(Continued)

FOREIGN PATENT DOCUMENTS

CA 2252074 11/1997
CA 2252021 11/1998
(Continued)

OTHER PUBLICATIONS

"Understanding the Interactivity Between Television and Mobile commerce", Robert Davis and David Yung, Communications of the ACM, Jul. 2005, vol. 48, No. 7, pp. 103-105.
(Continued)

*Primary Examiner* — Frantz B Jean
(74) *Attorney, Agent, or Firm* — Haverstock & Owens, A Law Corporation

(57) ABSTRACT

A method of and system for enabling a distributed entertainment system over a computing device is described herein. When implementing a distributed entertainment system wherein the entertainment system is directly correlated to live events or televised programs, there are a number of issues that must be addressed such as differing timing and channels of television programs and separate state laws. Furthermore, there are a plethora of varying computing device models possibly requiring model-specific software. An "Activity Client" is provided to handle such concerns. Furthermore, since time is of the essence for activities based on live or televised events, it is necessary to ensure a computing device is able to receive the necessary updates
(Continued)

for the program before the event begins. By providing only the needed components instead of entire data packages, the present invention is able to much more efficiently prepare users' computing devices in time.

148 Claims, 4 Drawing Sheets

Related U.S. Application Data continuation-in-part of application No. 14/997,352, filed on Jan. 15, 2016, now Pat. No. 10,165,339, which is a continuation of application No. 14/260,480, filed on Apr. 24, 2014, now Pat. No. 9,270,789, which is a continuation of application No. 11/472,241, filed on Jun. 20, 2006, now Pat. No. 8,738,694.

(60) Provisional application No. 60/692,356, filed on Jun. 20, 2005.

(51) Int. Cl.
| | |
|---|---|
| *H04N 21/475* | (2011.01) |
| *H04N 21/45* | (2011.01) |
| *H04N 21/443* | (2011.01) |
| *H04N 21/442* | (2011.01) |
| *H04N 21/2187* | (2011.01) |
| *H04N 7/173* | (2011.01) |
| *H04N 21/8545* | (2011.01) |
| *H04N 21/414* | (2011.01) |
| *H04N 21/43* | (2011.01) |
| *H04L 67/01* | (2022.01) |
| *H04L 67/52* | (2022.01) |

(52) U.S. Cl.
CPC ......... *H04N 7/173* (2013.01); *H04N 21/2187* (2013.01); *H04N 21/41407* (2013.01); *H04N 21/43074* (2020.08); *H04N 21/442* (2013.01); *H04N 21/4431* (2013.01); *H04N 21/4524* (2013.01); *H04N 21/4758* (2013.01); *H04N 21/4781* (2013.01); *H04N 21/8545* (2013.01)

(58) Field of Classification Search
CPC ........... H04N 21/4431; H04N 21/4524; H04N 21/4758; H04N 21/4781; H04N 21/8545; H04N 7/173; H04L 67/18; H04L 67/42
USPC ....................................................... 709/203
See application file for complete search history.

(56) References Cited

U.S. PATENT DOCUMENTS

| | | |
|---|---|---|
| 4,141,548 A | 2/1979 | Everton |
| 4,270,755 A | 6/1981 | Willhide et al. |
| 4,386,377 A | 5/1983 | Hunter, Jr. |
| 4,496,148 A | 1/1985 | Morstain et al. |
| 4,521,803 A | 6/1985 | Glittinger |
| 4,592,546 A | 6/1986 | Fascenda et al. |
| 4,816,904 A | 3/1989 | McKenna et al. |
| 4,918,603 A | 4/1990 | Hughes et al. |
| 4,930,010 A | 5/1990 | MacDonald |
| 5,013,038 A | 5/1991 | Luvenberg |
| 5,018,736 A | 5/1991 | Pearson et al. |
| 5,035,422 A | 7/1991 | Berman |
| 5,073,931 A | 12/1991 | Audebert et al. |
| 5,083,271 A | 1/1992 | Thatcher et al. |
| 5,083,800 A | 1/1992 | Lockton |
| 5,119,295 A | 6/1992 | Kapur |
| 5,120,076 A | 6/1992 | Luxenberg et al. |
| 5,213,337 A | 5/1993 | Sherman |
| 5,227,874 A | 7/1993 | Von Kohorn |
| 5,256,863 A | 10/1993 | Ferguson |
| 5,263,723 A | 11/1993 | Pearson et al. |
| 5,283,734 A | 2/1994 | Von Kohorn |
| 5,327,485 A | 7/1994 | Leaden |
| 5,343,236 A | 8/1994 | Koppe et al. |
| 5,343,239 A | 8/1994 | Lappington et al. |
| 5,417,424 A | 5/1995 | Snowden |
| 5,462,275 A | 10/1995 | Lowe et al. |
| 5,479,492 A | 12/1995 | Hofstee et al. |
| 5,488,659 A | 1/1996 | Millani |
| 5,519,433 A | 5/1996 | Lappington |
| 5,530,483 A | 6/1996 | Cooper |
| 5,553,120 A | 9/1996 | Katz |
| 5,566,291 A | 10/1996 | Boulton et al. |
| 5,585,975 A | 12/1996 | Bliss |
| 5,586,257 A | 12/1996 | Perlman |
| 5,589,765 A | 12/1996 | Ohmart et al. |
| 5,594,938 A | 1/1997 | Engel |
| 5,618,232 A | 4/1997 | Martin |
| 5,628,684 A | 5/1997 | Jean-Etienne |
| 5,636,920 A | 6/1997 | Shur et al. |
| 5,638,113 A | 6/1997 | Lappington |
| 5,643,088 A | 7/1997 | Vaughn et al. |
| 5,663,757 A | 9/1997 | Morales |
| 5,759,101 A | 6/1998 | Won Kohorn |
| 5,761,606 A | 6/1998 | Wolzien |
| 5,762,552 A | 6/1998 | Voung et al. |
| 5,764,275 A | 6/1998 | Lappington et al. |
| 5,794,210 A | 8/1998 | Goldhaber et al. |
| 5,805,230 A | 9/1998 | Staron |
| 5,813,913 A | 9/1998 | Berner et al. |
| 5,818,438 A * | 10/1998 | Howe ................ H04N 21/8166 715/718 |
| 5,828,843 A | 10/1998 | Grimm |
| 5,838,774 A | 11/1998 | Weiser, Jr. |
| 5,838,909 A | 11/1998 | Roy |
| 5,846,132 A | 12/1998 | Junkin |
| 5,848,397 A | 12/1998 | Marsh et al. |
| 5,860,862 A | 1/1999 | Junkin |
| 5,894,556 A | 4/1999 | Grimm |
| 5,916,024 A | 6/1999 | Von Kohorn |
| 5,870,683 A | 9/1999 | Wells et al. |
| 5,970,143 A | 10/1999 | Schneier et al. |
| 5,971,854 A | 10/1999 | Pearson et al. |
| 5,987,440 A | 11/1999 | O'Neil et al. |
| 6,009,458 A | 12/1999 | Hawkins et al. |
| 6,015,344 A | 1/2000 | Kelly et al. |
| 6,016,337 A | 1/2000 | Pykalisto |
| 6,038,599 A | 3/2000 | Black et al. |
| 6,042,477 A | 3/2000 | Addink |
| 6,064,449 A | 5/2000 | White |
| 6,104,815 A | 8/2000 | Alcorn et al. |
| 6,110,041 A | 8/2000 | Walker et al. |
| 6,117,013 A | 9/2000 | Elba |
| 6,126,543 A | 10/2000 | Friedman |
| 6,128,660 A | 10/2000 | Grimm |
| 6,135,881 A | 10/2000 | Abbott et al. |
| 6,154,131 A | 11/2000 | Jones, II |
| 6,174,237 B1 | 1/2001 | Stephenson |
| 6,182,084 B1 | 1/2001 | Cockrell et al. |
| 6,193,610 B1 | 2/2001 | Junkin |
| 6,222,642 B1 | 4/2001 | Farrell et al. |
| 6,233,736 B1 | 5/2001 | Wolzien |
| 6,251,017 B1 | 6/2001 | Leason et al. |
| 6,263,447 B1 | 7/2001 | French |
| 6,267,670 B1 | 7/2001 | Walker |
| 6,287,199 B1 | 9/2001 | McKeown et al. |
| 6,293,868 B1 | 9/2001 | Bernard |
| 6,312,336 B1 | 11/2001 | Handelman et al. |
| 6,343,320 B1 | 1/2002 | Fairchild |
| 6,345,297 B1 | 2/2002 | Grimm |
| 6,371,855 B1 | 4/2002 | Gavriloff |
| 6,373,462 B1 | 4/2002 | Pan |
| 6,411,969 B1 | 6/2002 | Tam |
| 6,416,414 B1 | 7/2002 | Stadelmann |
| 6,418,298 B1 | 7/2002 | Sonnenfeld |
| 6,425,828 B2 | 7/2002 | Walker et al. |
| 6,434,398 B1 | 8/2002 | Inselberg |
| 6,446,262 B1 | 9/2002 | Malaure et al. |

(56) References Cited

U.S. PATENT DOCUMENTS

| | | |
|---|---|---|
| 6,470,180 B1 | 10/2002 | Kotzin et al. |
| 6,475,090 B2 | 11/2002 | Gregory |
| 6,524,189 B1 | 2/2003 | Rautila |
| 6,527,641 B1 | 3/2003 | Sinclair et al. |
| 6,530,082 B1 | 3/2003 | Del Sesto et al. |
| 6,536,037 B1 | 3/2003 | Guheen et al. |
| 6,578,068 B1 | 6/2003 | Bowma-Amuah |
| 6,594,098 B1 | 7/2003 | Sutardja |
| 6,604,997 B2 | 7/2003 | Saidakovsky et al. |
| 6,610,953 B1 | 8/2003 | Tao et al. |
| 6,611,755 B1 | 8/2003 | Coffee |
| 6,648,760 B1 | 11/2003 | Nicastro |
| 6,659,860 B1 | 12/2003 | Yamamoto et al. |
| 6,659,861 B1 | 12/2003 | Faris |
| 6,659,872 B1 | 12/2003 | Kaufman et al. |
| 6,690,661 B1 | 2/2004 | Agarwal et al. |
| 6,697,869 B1 | 2/2004 | Mallart |
| 6,718,350 B1* | 4/2004 | Karbowski ............... G06F 8/65 707/695 |
| 6,752,396 B2 | 6/2004 | Smith |
| 6,758,754 B1 | 7/2004 | Lavanchy et al. |
| 6,758,755 B2 | 7/2004 | Kelly et al. |
| 6,760,595 B2 | 7/2004 | Insellberg |
| 6,763,377 B1 | 7/2004 | Balknap et al. |
| 6,766,524 B1 | 7/2004 | Matheny et al. |
| 6,774,926 B1* | 8/2004 | Ellis ................... H04N 21/4586 348/14.01 |
| 6,785,561 B1 | 8/2004 | Kim |
| 6,801,380 B1 | 10/2004 | Saturdja |
| 6,806,889 B1 | 10/2004 | Malaure et al. |
| 6,807,675 B1 | 10/2004 | Millard et al. |
| 6,811,482 B2 | 11/2004 | Letovsky |
| 6,811,487 B2 | 11/2004 | Sengoku |
| 6,816,628 B1 | 11/2004 | Sarachik et al. |
| 6,817,947 B2 | 11/2004 | Tanskanen |
| 6,824,469 B2 | 11/2004 | Allibhoy et al. |
| 6,837,789 B2 | 1/2005 | Garahi et al. |
| 6,837,791 B1 | 1/2005 | McNutt et al. |
| 6,840,861 B2 | 1/2005 | Jordan et al. |
| 6,845,389 B1 | 1/2005 | Sen |
| 6,846,239 B2 | 1/2005 | Washio |
| 6,857,122 B1 | 2/2005 | Takeda et al. |
| 6,863,610 B2 | 3/2005 | Vancraeynest |
| 6,870,720 B2 | 3/2005 | Iwata et al. |
| 6,871,226 B1 | 3/2005 | Ensley et al. |
| 6,873,610 B1 | 3/2005 | Noever |
| 6,884,166 B2 | 4/2005 | Leen et al. |
| 6,884,172 B1 | 4/2005 | Lloyd et al. |
| 6,887,159 B2 | 5/2005 | Leen et al. |
| 6,888,929 B1 | 5/2005 | Saylor |
| 6,893,347 B1 | 5/2005 | Zilliacus et al. |
| 6,898,762 B2 | 5/2005 | Ellis et al. |
| 6,899,628 B2 | 5/2005 | Leen et al. |
| 6,903,681 B2 | 6/2005 | Faris |
| 6,908,389 B1 | 6/2005 | Puskala |
| 6,942,574 B1 | 9/2005 | LeMay et al. |
| 6,944,228 B1 | 9/2005 | Dakss et al. |
| 6,960,088 B1 | 11/2005 | Long |
| 6,978,053 B1 | 12/2005 | Sarachik et al. |
| 7,001,279 B1 | 2/2006 | Barber et al. |
| 7,029,394 B2 | 4/2006 | Leen et al. |
| 7,035,626 B1 | 4/2006 | Luciano, Jr. |
| 7,035,653 B2 | 4/2006 | Simon et al. |
| 7,058,592 B1 | 6/2006 | Beckerman et al. |
| 7,076,434 B1 | 7/2006 | Newman et al. |
| 7,085,552 B2 | 8/2006 | Buckley |
| 7,116,310 B1 | 10/2006 | Evans et al. |
| 7,117,517 B1 | 10/2006 | Milazzo et al. |
| 7,120,924 B1 | 10/2006 | Katcher et al. |
| 7,124,410 B2 | 10/2006 | Berg |
| 7,125,336 B2 | 10/2006 | Anttila et al. |
| 7,136,871 B2 | 11/2006 | Ozer et al. |
| 7,144,011 B2 | 12/2006 | Asher et al. |
| 7,169,050 B1 | 1/2007 | Tyler |
| 7,185,355 B1 | 2/2007 | Ellis |
| 7,187,658 B2 | 3/2007 | Koyanagi |
| 7,191,447 B1 | 3/2007 | Ellis et al. |
| 7,192,352 B2 | 3/2007 | Walker et al. |
| 7,194,758 B1 | 3/2007 | Waki et al. |
| 7,228,349 B2 | 6/2007 | Barone, Jr. et al. |
| 7,231,630 B2 | 6/2007 | Acott et al. |
| 7,233,922 B2 | 6/2007 | Asher et al. |
| 7,240,093 B1 | 7/2007 | Danieli et al. |
| 7,244,181 B2 | 7/2007 | Wang et al. |
| 7,249,367 B2 | 7/2007 | Bove, Jr. et al. |
| 7,254,605 B1 | 8/2007 | Strum |
| 7,260,782 B2 | 8/2007 | Wallace et al. |
| RE39,818 E | 9/2007 | Slifer |
| 7,283,830 B2 | 10/2007 | Buckley |
| 7,288,027 B2 | 10/2007 | Overton |
| 7,341,517 B2 | 3/2008 | Asher et al. |
| 7,343,617 B1 | 3/2008 | Kartcher et al. |
| 7,347,781 B2 | 3/2008 | Schultz |
| 7,351,149 B1 | 4/2008 | Simon et al. |
| 7,367,042 B2 | 4/2008 | Dakss et al. |
| 7,379,705 B1 | 5/2008 | Rados et al. |
| 7,389,144 B1 | 6/2008 | Osorio |
| 7,430,718 B2 | 9/2008 | Gariepy-Viles |
| 7,452,273 B2 | 11/2008 | Amaitis et al. |
| 7,460,037 B2 | 12/2008 | Cattone et al. |
| 7,461,067 B2 | 12/2008 | Dewing et al. |
| 7,502,610 B2 | 3/2009 | Maher |
| 7,510,474 B2 | 3/2009 | Carter, Sr. |
| 7,517,282 B1 | 4/2009 | Pryor |
| 7,534,169 B2 | 5/2009 | Amaitis et al. |
| 7,543,052 B1 | 6/2009 | Cesa Klein |
| 7,562,134 B1 | 7/2009 | Fingerhut et al. |
| 7,602,808 B2 | 10/2009 | Ullmann |
| 7,610,330 B1 | 10/2009 | Quinn |
| 7,614,944 B1 | 11/2009 | Hughes et al. |
| 7,630,986 B1 | 12/2009 | Herz et al. |
| 7,693,781 B2 | 4/2010 | Asher et al. |
| 7,699,707 B2 | 4/2010 | Bahou |
| 7,702,723 B2 | 4/2010 | Dyl |
| 7,711,628 B2 | 5/2010 | Davie et al. |
| 7,729,286 B2 | 6/2010 | Mishra |
| 7,753,772 B1 | 7/2010 | Walker |
| 7,753,789 B2 | 7/2010 | Walker et al. |
| 7,780,528 B2 | 8/2010 | Hirayama |
| 7,828,661 B1 | 11/2010 | Fish |
| 7,835,961 B2 | 11/2010 | Davie et al. |
| 7,860,993 B2 | 12/2010 | Chintala |
| 7,886,003 B2 | 2/2011 | Newman |
| 7,907,211 B2 | 3/2011 | Oostveen et al. |
| 7,907,598 B2 | 3/2011 | Anisimov |
| 7,909,332 B2 | 3/2011 | Root |
| 7,925,756 B1 | 4/2011 | Riddle |
| 7,926,810 B2 | 4/2011 | Fisher et al. |
| 7,937,318 B2 | 5/2011 | Davie et al. |
| 7,941,482 B2 | 5/2011 | Bates |
| 7,941,804 B1 | 5/2011 | Herington |
| 7,976,389 B2 | 7/2011 | Cannon et al. |
| 8,002,618 B1 | 8/2011 | Lockton |
| 8,006,314 B2 | 8/2011 | Wold |
| 8,025,565 B2 | 9/2011 | Leen et al. |
| 8,028,315 B1 | 9/2011 | Barber |
| 8,082,150 B2 | 12/2011 | Wold |
| 8,086,445 B2 | 12/2011 | Wold et al. |
| 8,086,510 B2 | 12/2011 | Amaitis et al. |
| 8,092,303 B2 | 1/2012 | Amaitis et al. |
| 8,092,306 B2 | 1/2012 | Root |
| 8,105,141 B2 | 1/2012 | Leen et al. |
| 8,107,674 B2 | 1/2012 | Davis et al. |
| 8,109,827 B2 | 2/2012 | Cahill et al. |
| 8,128,474 B2 | 3/2012 | Amaitis et al. |
| 8,147,313 B2 | 4/2012 | Amaitis et al. |
| 8,147,373 B2 | 4/2012 | Amaitis et al. |
| 8,149,530 B1 | 4/2012 | Lockton et al. |
| 8,155,637 B2 | 4/2012 | Fujisawa |
| 8,162,759 B2 | 4/2012 | Yamaguchi |
| 8,176,518 B1 | 5/2012 | Junkin et al. |
| 8,186,682 B2 | 5/2012 | Amaitis et al. |
| 8,204,808 B2 | 6/2012 | Amaitis et al. |
| 8,219,617 B2 | 7/2012 | Ashida |

(56) References Cited

U.S. PATENT DOCUMENTS

| | | |
|---|---|---|
| 8,240,669 B2 | 8/2012 | Asher et al. |
| 8,246,048 B2 | 8/2012 | Amaitis et al. |
| 8,267,403 B2 | 9/2012 | Fisher et al. |
| 8,342,924 B2 | 1/2013 | Leen et al. |
| 8,342,942 B2 | 1/2013 | Amaitis et al. |
| 8,353,763 B2 | 1/2013 | Amaitis et al. |
| 8,376,855 B2 | 2/2013 | Lockton et al. |
| 8,396,001 B2 | 3/2013 | Jung |
| 8,397,257 B1 | 3/2013 | Barber |
| 8,465,021 B2 | 6/2013 | Asher et al. |
| 8,473,393 B2 | 6/2013 | Davie et al. |
| 8,474,819 B2 | 7/2013 | Asher et al. |
| 8,535,138 B2 | 9/2013 | Amaitis et al. |
| 8,538,563 B1 | 9/2013 | Barber |
| 8,543,487 B2 | 9/2013 | Asher et al. |
| 8,555,313 B2 | 10/2013 | Newnam |
| 8,556,691 B2 | 10/2013 | Leen et al. |
| 8,585,490 B2 | 11/2013 | Amaitis et al. |
| 8,622,798 B2 | 1/2014 | Lockton et al. |
| 8,632,392 B2 | 1/2014 | Shore et al. |
| 8,634,943 B2 | 1/2014 | Root |
| 8,638,517 B2 | 1/2014 | Lockton et al. |
| 8,641,511 B2 | 2/2014 | Ginsberg et al. |
| 8,659,848 B2 | 2/2014 | Lockton et al. |
| 8,672,751 B2 | 3/2014 | Leen et al. |
| 8,699,168 B2 | 4/2014 | Lockton et al. |
| 8,705,195 B2 | 4/2014 | Lockton |
| 8,708,789 B2 | 4/2014 | Asher et al. |
| 8,717,701 B2 | 5/2014 | Lockton et al. |
| 8,727,352 B2 | 5/2014 | Amaitis et al. |
| 8,734,227 B2 | 5/2014 | Leen et al. |
| 8,737,004 B2 | 5/2014 | Lockton et al. |
| 8,738,694 B2 | 5/2014 | Huske et al. |
| 8,771,058 B2 | 7/2014 | Alderucci et al. |
| 8,780,482 B2 | 7/2014 | Lockton et al. |
| 8,805,732 B2 | 8/2014 | Davie et al. |
| 8,813,112 B1 | 8/2014 | Cibula et al. |
| 8,814,664 B2 | 8/2014 | Amaitis et al. |
| 8,817,408 B2 | 8/2014 | Lockton et al. |
| 8,837,072 B2 | 9/2014 | Lockton et al. |
| 8,849,225 B1 | 9/2014 | Choti |
| 8,849,255 B2 * | 9/2014 | Choti ............... H04L 67/18 455/414.1 |
| 8,858,313 B1 | 10/2014 | Selfors |
| 8,870,639 B2 | 10/2014 | Lockton et al. |
| 8,935,715 B2 | 1/2015 | Cibula et al. |
| 9,056,251 B2 | 6/2015 | Lockton |
| 9,067,143 B2 | 6/2015 | Lockton et al. |
| 9,069,651 B2 | 6/2015 | Barber |
| 9,076,303 B1 | 7/2015 | Park |
| 9,098,883 B2 | 8/2015 | Asher et al. |
| 9,111,417 B2 | 8/2015 | Leen et al. |
| 9,205,339 B2 | 12/2015 | Cibula et al. |
| 9,233,293 B2 | 1/2016 | Lockton |
| 9,258,601 B2 | 2/2016 | Lockton et al. |
| 9,270,789 B2 | 2/2016 | Huske et al. |
| 9,289,692 B2 | 3/2016 | Barber |
| 9,306,952 B2 | 4/2016 | Burman et al. |
| 9,314,686 B2 | 4/2016 | Lockton |
| 9,314,701 B2 | 4/2016 | Lockton et al. |
| 9,355,518 B2 | 5/2016 | Amaitis et al. |
| 9,406,189 B2 | 8/2016 | Scott et al. |
| 9,430,901 B2 | 8/2016 | Amaitis et al. |
| 9,457,272 B2 | 10/2016 | Lockton et al. |
| 9,498,724 B2 | 11/2016 | Lockton et al. |
| 9,501,904 B2 | 11/2016 | Lockton |
| 9,504,922 B2 | 11/2016 | Lockton et al. |
| 9,511,287 B2 | 12/2016 | Lockton et al. |
| 9,526,991 B2 | 12/2016 | Lockton et al. |
| 9,536,396 B2 | 1/2017 | Amaitis et al. |
| 9,556,991 B2 | 1/2017 | Furuya |
| 9,604,140 B2 | 3/2017 | Lockton et al. |
| 9,652,937 B2 | 5/2017 | Lockton |
| 9,662,576 B2 | 5/2017 | Lockton et al. |
| 9,662,577 B2 | 5/2017 | Lockton et al. |
| 9,672,692 B2 | 6/2017 | Lockton |
| 9,687,738 B2 | 6/2017 | Lockton et al. |
| 9,687,739 B2 | 6/2017 | Lockton et al. |
| 9,707,482 B2 | 7/2017 | Lockton et al. |
| 9,716,918 B1 | 7/2017 | Lockton et al. |
| 9,724,603 B2 | 8/2017 | Lockton et al. |
| 9,744,453 B2 | 8/2017 | Lockton et al. |
| 9,805,549 B2 | 10/2017 | Asher et al. |
| 9,821,233 B2 | 11/2017 | Lockton et al. |
| 9,878,243 B2 | 1/2018 | Lockton et al. |
| 9,881,337 B2 | 1/2018 | Jaycob et al. |
| 9,901,820 B2 | 2/2018 | Lockton et al. |
| 9,908,053 B2 | 3/2018 | Lockton et al. |
| 9,919,210 B2 | 3/2018 | Lockton |
| 9,919,211 B2 | 3/2018 | Lockton et al. |
| 9,919,221 B2 | 3/2018 | Lockton et al. |
| 9,978,217 B2 | 5/2018 | Lockton |
| 9,993,730 B2 | 6/2018 | Lockton et al. |
| 9,999,834 B2 | 6/2018 | Lockton et al. |
| 10,052,557 B2 | 8/2018 | Lockton et al. |
| 10,089,815 B2 | 10/2018 | Asher et al. |
| 10,096,210 B2 | 10/2018 | Amaitis et al. |
| 10,137,369 B2 | 11/2018 | Lockton et al. |
| 10,150,031 B2 | 12/2018 | Lockton et al. |
| 10,165,339 B2 | 12/2018 | Huske et al. |
| 10,186,116 B2 | 1/2019 | Lookton |
| 10,195,526 B2 | 2/2019 | Lookton et al. |
| 10,226,698 B1 | 3/2019 | Lookton et al. |
| 10,226,705 B2 | 3/2019 | Lookton et al. |
| 10,232,270 B2 | 3/2019 | Lookton et al. |
| 10,248,290 B2 | 4/2019 | Galfond |
| 10,279,253 B2 | 5/2019 | Lockton |
| 10,360,767 B2 | 7/2019 | Russell et al. |
| 10,569,175 B2 | 2/2020 | Kosai et al. |
| 10,653,955 B2 | 5/2020 | Lockton |
| 10,695,672 B2 | 6/2020 | Lockton et al. |
| 10,709,987 B2 | 7/2020 | Lockton et al. |
| 10,721,543 B2 | 7/2020 | Huske et al. |
| 10,981,070 B2 | 4/2021 | Isgreen |
| 2001/0004609 A1 | 6/2001 | Walker et al. |
| 2001/0005670 A1 | 6/2001 | Lahtinen |
| 2001/0013067 A1 | 8/2001 | Koyanagi |
| 2001/0013125 A1 | 8/2001 | Kitsukawa et al. |
| 2001/0020298 A1 | 9/2001 | Rector, Jr. et al. |
| 2001/0032333 A1 | 10/2001 | Flickinger |
| 2001/0036272 A1 | 11/2001 | Hirayama |
| 2001/0036853 A1 * | 11/2001 | Thomas ............... G06Q 50/34 463/17 |
| 2001/0044339 A1 | 11/2001 | Cordero |
| 2001/0054019 A1 | 12/2001 | de Fabrega |
| 2002/0010789 A1 | 1/2002 | Lord |
| 2002/0018477 A1 | 2/2002 | Katz |
| 2002/0026321 A1 | 2/2002 | Faris |
| 2002/0029381 A1 | 3/2002 | Inselberg |
| 2002/0035609 A1 * | 3/2002 | Lessard ............... G06F 16/9537 709/217 |
| 2002/0037766 A1 | 3/2002 | Muniz |
| 2002/0069265 A1 | 3/2002 | Bountour |
| 2002/0042293 A1 | 4/2002 | Ubale et al. |
| 2002/0046099 A1 | 4/2002 | Frengut et al. |
| 2002/0054088 A1 | 5/2002 | Tanskanen et al. |
| 2002/0055385 A1 | 5/2002 | Otsu |
| 2002/0056089 A1 | 5/2002 | Houston |
| 2002/0059094 A1 | 5/2002 | Hosea et al. |
| 2002/0059623 A1 * | 5/2002 | Rodriguez ......... H04N 21/8166 725/91 |
| 2002/0069076 A1 | 6/2002 | Faris |
| 2002/0076084 A1 | 6/2002 | Tian |
| 2002/0078176 A1 | 6/2002 | Nomura et al. |
| 2002/0083461 A1 | 6/2002 | Hutcheson |
| 2002/0091833 A1 | 7/2002 | Grimm |
| 2002/0094869 A1 | 7/2002 | Harkham |
| 2002/0095333 A1 | 7/2002 | Jokinen et al. |
| 2002/0097983 A1 | 7/2002 | Wallace et al. |
| 2002/0099709 A1 | 7/2002 | Wallace |
| 2002/0100063 A1 | 7/2002 | Herigstad et al. |
| 2002/0103696 A1 | 8/2002 | Huang et al. |
| 2002/0105535 A1 | 8/2002 | Wallace et al. |
| 2002/0107073 A1 | 8/2002 | Binney |

(56) References Cited

U.S. PATENT DOCUMENTS

| | | |
|---|---|---|
| 2002/0108112 A1 | 8/2002 | Wallace et al. |
| 2002/0108125 A1 | 8/2002 | Joao |
| 2002/0108127 A1 | 8/2002 | Lew et al. |
| 2002/0112249 A1 | 8/2002 | Hendricks et al. |
| 2002/0115488 A1 | 8/2002 | Berry et al. |
| 2002/0119821 A1 | 8/2002 | Sen |
| 2002/0120930 A1 | 8/2002 | Yona |
| 2002/0124247 A1 | 9/2002 | Houghton |
| 2002/0132614 A1 | 9/2002 | Vanlujit et al. |
| 2002/0133817 A1 | 9/2002 | Markel |
| 2002/0133827 A1 | 9/2002 | Newman et al. |
| 2002/0142843 A1 | 10/2002 | Roelofs |
| 2002/0144273 A1 | 10/2002 | Reto |
| 2002/0147049 A1 | 10/2002 | Carter, Sr. |
| 2002/0157002 A1 | 10/2002 | Messerges et al. |
| 2002/0157005 A1 | 10/2002 | Bunk |
| 2002/0159576 A1 | 10/2002 | Adams |
| 2002/0162031 A1 | 10/2002 | Levin et al. |
| 2002/0162117 A1 | 10/2002 | Pearson |
| 2002/0165020 A1 | 11/2002 | Koyama |
| 2002/0165025 A1 | 11/2002 | Kawahara |
| 2002/0177483 A1 | 11/2002 | Cannon |
| 2002/0184624 A1 | 12/2002 | Spencer |
| 2002/0187825 A1 | 12/2002 | Tracy |
| 2002/0198050 A1 | 12/2002 | Patchen |
| 2003/0002638 A1 | 1/2003 | Kaars |
| 2003/0003997 A1 | 1/2003 | Vuong et al. |
| 2003/0013528 A1 | 1/2003 | Allibhoy et al. |
| 2003/0023547 A1 | 1/2003 | France |
| 2003/0040363 A1 | 2/2003 | Sandberg |
| 2003/0054885 A1 | 3/2003 | Pinto et al. |
| 2003/0060247 A1 | 3/2003 | Goldberg et al. |
| 2003/0066089 A1 | 4/2003 | Anderson |
| 2003/0069828 A1 | 4/2003 | Blazey et al. |
| 2003/0070174 A1 | 4/2003 | Solomon |
| 2003/0078924 A1 | 4/2003 | Liechty et al. |
| 2003/0086691 A1 | 5/2003 | Yu |
| 2003/0087652 A1 | 5/2003 | Simon et al. |
| 2003/0088648 A1 | 5/2003 | Bellaton |
| 2003/0114224 A1 | 6/2003 | Anttila et al. |
| 2003/0115152 A1 | 6/2003 | Flaherty |
| 2003/0125109 A1 | 7/2003 | Green |
| 2003/0134678 A1 | 7/2003 | Tanaka |
| 2003/0144017 A1 | 7/2003 | Inselberg |
| 2003/0154242 A1 | 8/2003 | Hayes et al. |
| 2003/0165241 A1* | 9/2003 | Fransdonk ......... G06Q 20/3823 380/258 |
| 2003/0177167 A1 | 9/2003 | Lafage et al. |
| 2003/0177504 A1 | 9/2003 | Paulo et al. |
| 2003/0189668 A1 | 10/2003 | Newman et al. |
| 2003/0195023 A1 | 10/2003 | Di Cesare |
| 2003/0195807 A1 | 10/2003 | Maggio |
| 2003/0208579 A1* | 11/2003 | Brady, Jr. ............... H04L 67/34 709/223 |
| 2003/0211856 A1 | 11/2003 | Zilliacus |
| 2003/0212691 A1 | 11/2003 | Kuntala et al. |
| 2003/0216185 A1 | 11/2003 | Varley |
| 2003/0216857 A1 | 11/2003 | Feldman et al. |
| 2003/0228866 A1* | 12/2003 | Pezeshki ................. H04L 67/04 455/422.1 |
| 2003/0233425 A1 | 12/2003 | Lyons et al. |
| 2004/0005919 A1 | 1/2004 | Walker et al. |
| 2004/0014524 A1 | 1/2004 | Pearlman |
| 2004/0015442 A1 | 1/2004 | Hmlinen |
| 2004/0022366 A1 | 2/2004 | Ferguson et al. |
| 2004/0025190 A1 | 2/2004 | McCalla |
| 2004/0056897 A1 | 3/2004 | Ueda |
| 2004/0060063 A1 | 3/2004 | Russ et al. |
| 2004/0073915 A1 | 4/2004 | Dureau |
| 2004/0088729 A1 | 5/2004 | Petrovic et al. |
| 2004/0093302 A1 | 5/2004 | Baker et al. |
| 2004/0152454 A1 | 5/2004 | Kauppinen |
| 2004/0107138 A1 | 6/2004 | Maggio |
| 2004/0117831 A1 | 6/2004 | Ellis et al. |
| 2004/0117839 A1 | 6/2004 | Watson et al. |
| 2004/0125877 A1 | 7/2004 | Chang |
| 2004/0128319 A1 | 7/2004 | Davis et al. |
| 2004/0139158 A1 | 7/2004 | Datta |
| 2004/0139482 A1 | 7/2004 | Hale |
| 2004/0148638 A1 | 7/2004 | Weisman et al. |
| 2004/0152517 A1 | 8/2004 | Haedisty |
| 2004/0152519 A1 | 8/2004 | Wang |
| 2004/0158855 A1 | 8/2004 | Gu et al. |
| 2004/0162124 A1 | 8/2004 | Barton et al. |
| 2004/0166873 A1 | 8/2004 | Simic |
| 2004/0176162 A1 | 9/2004 | Rothschild |
| 2004/0178923 A1 | 9/2004 | Kuang |
| 2004/0183824 A1 | 9/2004 | Benson |
| 2004/0185881 A1 | 9/2004 | Lee |
| 2004/0190779 A1 | 9/2004 | Sarachik et al. |
| 2004/0198495 A1 | 10/2004 | Cisneros et al. |
| 2004/0201626 A1 | 10/2004 | Lavoie |
| 2004/0203667 A1 | 10/2004 | Shroder |
| 2004/0203898 A1 | 10/2004 | Bodin et al. |
| 2004/0210507 A1 | 10/2004 | Asher et al. |
| 2004/0215756 A1 | 10/2004 | VanAntwerp |
| 2004/0216161 A1 | 10/2004 | Barone, Jr. et al. |
| 2004/0216171 A1 | 10/2004 | Barone, Jr. et al. |
| 2004/0224750 A1 | 11/2004 | Ai-Ziyoud |
| 2004/0242321 A1 | 12/2004 | Overton |
| 2004/0266513 A1 | 12/2004 | Odom |
| 2005/0005303 A1 | 1/2005 | Barone, Jr. et al. |
| 2005/0021942 A1 | 1/2005 | Diehl et al. |
| 2005/0026699 A1 | 2/2005 | Kinzer et al. |
| 2005/0028208 A1 | 2/2005 | Ellis |
| 2005/0043094 A1 | 2/2005 | Nguyen et al. |
| 2005/0076371 A1 | 4/2005 | Nakamura |
| 2005/0077997 A1 | 4/2005 | Landram |
| 2005/0060219 A1 | 5/2005 | Ditering et al. |
| 2005/0097599 A1 | 5/2005 | Potnick et al. |
| 2005/0101309 A1* | 5/2005 | Croome ............... G06F 9/44584 455/418 |
| 2005/0113164 A1 | 5/2005 | Buecheler et al. |
| 2005/0003878 A1 | 6/2005 | Updike |
| 2005/0131984 A1 | 6/2005 | Hofmann et al. |
| 2005/0138668 A1 | 6/2005 | Gray et al. |
| 2005/0144102 A1 | 6/2005 | Johnson |
| 2005/0155083 A1 | 7/2005 | Oh |
| 2005/0177861 A1 | 8/2005 | Ma et al. |
| 2005/0210526 A1 | 9/2005 | Levy et al. |
| 2005/0216838 A1 | 9/2005 | Graham |
| 2005/0235043 A1 | 10/2005 | Teodosiu et al. |
| 2005/0239551 A1 | 10/2005 | Griswold |
| 2005/0255901 A1 | 11/2005 | Kreutzer |
| 2005/0256895 A1 | 11/2005 | Dussault |
| 2005/0266869 A1 | 12/2005 | Jung |
| 2005/0267969 A1 | 12/2005 | Poikselka et al. |
| 2005/0273804 A1 | 12/2005 | Preisman |
| 2005/0283800 A1 | 12/2005 | Ellis et al. |
| 2005/0288080 A1 | 12/2005 | Lockton |
| 2005/0288101 A1 | 12/2005 | Lockton et al. |
| 2005/0288812 A1 | 12/2005 | Cheng |
| 2006/0020700 A1 | 1/2006 | Qiu |
| 2006/0025070 A1 | 2/2006 | Kim et al. |
| 2006/0046810 A1 | 3/2006 | Tabata |
| 2006/0047772 A1* | 3/2006 | Crutcher .................. H04L 67/02 709/212 |
| 2006/0053390 A1 | 3/2006 | Gariepy-Viles |
| 2006/0058103 A1 | 3/2006 | Danieli |
| 2006/0059161 A1 | 3/2006 | Millett et al. |
| 2006/0063590 A1 | 3/2006 | Abassi et al. |
| 2006/0082068 A1 | 4/2006 | Patchen |
| 2006/0087585 A1 | 4/2006 | Seo |
| 2006/0089199 A1 | 4/2006 | Jordan et al. |
| 2006/0094409 A1 | 5/2006 | Inselberg |
| 2006/0101492 A1 | 5/2006 | Lowcock |
| 2006/0111168 A1 | 5/2006 | Nguyen |
| 2006/0135253 A1 | 6/2006 | George et al. |
| 2006/0148569 A1 | 7/2006 | Beck |
| 2006/0156371 A1 | 7/2006 | Maetz et al. |
| 2006/0160597 A1 | 7/2006 | Wright |
| 2006/0174307 A1 | 8/2006 | Hwang et al. |
| 2006/0183547 A1 | 8/2006 | McMonigle |
| 2006/0183548 A1 | 8/2006 | Morris et al. |

(56) References Cited

U.S. PATENT DOCUMENTS

| | | |
|---|---|---|
| 2006/0190654 A1 | 8/2006 | Joy |
| 2006/0205483 A1 | 9/2006 | Meyer et al. |
| 2006/0205509 A1 | 9/2006 | Hirota |
| 2006/0205510 A1 | 9/2006 | Lauper |
| 2006/0217198 A1 | 9/2006 | Johnson |
| 2006/0236352 A1 | 10/2006 | Scott, III |
| 2006/0248553 A1 | 11/2006 | Mikkelson et al. |
| 2006/0248564 A1 | 11/2006 | Zinevitch |
| 2006/0256865 A1 | 11/2006 | Westerman |
| 2006/0256868 A1 | 11/2006 | Westerman |
| 2006/0269120 A1 | 11/2006 | Mehmadi et al. |
| 2006/0285586 A1 | 12/2006 | Westerman |
| 2007/0004516 A1 | 1/2007 | Jordan et al. |
| 2007/0013547 A1 | 1/2007 | Boaz |
| 2007/0019826 A1 | 1/2007 | Horbach et al. |
| 2007/0028272 A1 | 2/2007 | Lockton |
| 2007/0037623 A1 | 2/2007 | Romik |
| 2007/0054695 A1 | 3/2007 | Huske et al. |
| 2007/0078009 A1 | 4/2007 | Lockton et al. |
| 2007/0083920 A1 | 4/2007 | Mizoguchi et al. |
| 2007/0086465 A1 | 4/2007 | Paila et al. |
| 2007/0087832 A1 | 4/2007 | Abbott |
| 2007/0093296 A1 | 4/2007 | Asher |
| 2007/0101358 A1 | 5/2007 | Ambady |
| 2007/0106721 A1 | 5/2007 | Schloter |
| 2007/0107010 A1 | 5/2007 | Jolna et al. |
| 2007/0129144 A1 | 6/2007 | Katz |
| 2007/0147870 A1 | 7/2007 | Nagashima et al. |
| 2007/0162328 A1 | 7/2007 | Reich |
| 2007/0183744 A1 | 8/2007 | Koizumi |
| 2007/0197247 A1 | 8/2007 | Inselberg |
| 2007/0210908 A1 | 9/2007 | Putterman et al. |
| 2007/0219856 A1 | 9/2007 | Ahmad-Taylor |
| 2007/0222652 A1 | 9/2007 | Cattone et al. |
| 2007/0226062 A1 | 9/2007 | Hughes et al. |
| 2007/0238525 A1 | 10/2007 | Suomela |
| 2007/0243936 A1 | 10/2007 | Binenstock et al. |
| 2007/0244570 A1 | 10/2007 | Speiser et al. |
| 2007/0244585 A1 | 10/2007 | Speiser et al. |
| 2007/0244749 A1 | 10/2007 | Speiser et al. |
| 2007/0265089 A1 | 11/2007 | Robarts |
| 2007/0294410 A1 | 12/2007 | Pandya |
| 2008/0005037 A1 | 1/2008 | Hammad |
| 2008/0013927 A1 | 1/2008 | Kelly et al. |
| 2008/0051201 A1 | 2/2008 | Lore |
| 2008/0066129 A1 | 3/2008 | Katcher et al. |
| 2008/0076497 A1 | 3/2008 | Kiskis et al. |
| 2008/0104630 A1 | 5/2008 | Bruce |
| 2008/0146337 A1 | 6/2008 | Halonen |
| 2008/0169605 A1 | 7/2008 | Shuster et al. |
| 2008/0222672 A1 | 9/2008 | Piesing |
| 2008/0240681 A1 | 10/2008 | Fukushima |
| 2008/0248865 A1 | 10/2008 | Tedesco |
| 2008/0270288 A1 | 10/2008 | Butterly et al. |
| 2008/0288600 A1 | 11/2008 | Clark |
| 2009/0011781 A1 | 1/2009 | Merrill et al. |
| 2009/0094632 A1 | 4/2009 | Newman et al. |
| 2009/0103892 A1 | 4/2009 | Hirayama |
| 2009/0186676 A1 | 7/2009 | Amaitis et al. |
| 2009/0163271 A1 | 9/2009 | George et al. |
| 2009/0228351 A1 | 9/2009 | Rijsenbrij |
| 2009/0234674 A1* | 9/2009 | Wurster .............. G06Q 50/22 705/3 |
| 2009/0264188 A1 | 10/2009 | Soukup |
| 2009/0271512 A1 | 10/2009 | Jorgensen |
| 2009/0325716 A1 | 12/2009 | Harari |
| 2010/0099421 A1 | 4/2010 | Patel et al. |
| 2010/0099471 A1 | 4/2010 | Feeney et al. |
| 2010/0107194 A1 | 4/2010 | McKissick et al. |
| 2010/0120503 A1 | 5/2010 | Hoffman et al. |
| 2010/0137057 A1 | 6/2010 | Fleming |
| 2010/0203936 A1 | 8/2010 | Levy |
| 2010/0279764 A1 | 11/2010 | Allen et al. |
| 2010/0296511 A1 | 11/2010 | Prodan |
| 2011/0016224 A1 | 1/2011 | Riley |
| 2011/0053681 A1 | 3/2011 | Goldman |
| 2011/0065490 A1 | 3/2011 | Lutnick |
| 2011/0081958 A1 | 4/2011 | Herman |
| 2011/0116461 A1 | 5/2011 | Holt |
| 2011/0130197 A1 | 6/2011 | Bythar et al. |
| 2011/0227287 A1 | 9/2011 | Reabe |
| 2011/0269548 A1 | 11/2011 | Barclay et al. |
| 2011/0306428 A1 | 12/2011 | Lockton et al. |
| 2012/0058808 A1 | 3/2012 | Lockton |
| 2012/0115585 A1 | 5/2012 | Goldman |
| 2012/0157178 A1 | 6/2012 | Lockton |
| 2012/0264496 A1 | 10/2012 | Behrman et al. |
| 2012/0282995 A1 | 11/2012 | Allen et al. |
| 2012/0295686 A1 | 11/2012 | Lockton |
| 2013/0005453 A1 | 1/2013 | Nguyen et al. |
| 2013/0072271 A1 | 3/2013 | Lockton et al. |
| 2013/0079081 A1 | 3/2013 | Lockton et al. |
| 2013/0079092 A1 | 3/2013 | Lockton et al. |
| 2013/0079093 A1 | 3/2013 | Lockton et al. |
| 2013/0079135 A1 | 3/2013 | Lockton et al. |
| 2013/0079150 A1 | 3/2013 | Lockton et al. |
| 2013/0079151 A1 | 3/2013 | Lockton et al. |
| 2013/0196774 A1 | 8/2013 | Lockton et al. |
| 2013/0225285 A1 | 8/2013 | Lockton |
| 2013/0225299 A1 | 8/2013 | Lockton |
| 2014/0031134 A1 | 1/2014 | Lockton et al. |
| 2014/0100011 A1 | 4/2014 | Gingher |
| 2014/0106832 A1 | 4/2014 | Lockton et al. |
| 2014/0128139 A1 | 5/2014 | Shuster et al. |
| 2014/0155130 A1 | 6/2014 | Lockton et al. |
| 2014/0155134 A1 | 6/2014 | Lockton |
| 2014/0206446 A1 | 7/2014 | Lockton et al. |
| 2014/0237025 A1 | 8/2014 | Huske et al. |
| 2014/0248952 A1 | 9/2014 | Cibula et al. |
| 2014/0256432 A1 | 9/2014 | Lockton et al. |
| 2014/0279439 A1 | 9/2014 | Brown |
| 2014/0287832 A1 | 9/2014 | Lockton et al. |
| 2014/0309001 A1 | 10/2014 | Root |
| 2014/0335961 A1 | 11/2014 | Lockton et al. |
| 2014/0335962 A1 | 11/2014 | Lockton et al. |
| 2014/0378212 A1 | 12/2014 | Sims |
| 2015/0011310 A1 | 1/2015 | Lockton et al. |
| 2015/0024814 A1 | 1/2015 | Root |
| 2015/0067732 A1 | 3/2015 | Howe et al. |
| 2015/0148130 A1 | 5/2015 | Cibula et al. |
| 2015/0238839 A1 | 8/2015 | Lockton |
| 2015/0238873 A1 | 8/2015 | Arnone et al. |
| 2015/0258452 A1 | 9/2015 | Lockton et al. |
| 2015/0356831 A1 | 12/2015 | Osibodu |
| 2016/0023116 A1 | 1/2016 | Wire |
| 2016/0045824 A1 | 2/2016 | Lockton et al. |
| 2016/0049049 A1 | 2/2016 | Lockton |
| 2016/0054872 A1 | 2/2016 | Cibula et al. |
| 2016/0082357 A1 | 3/2016 | Lockton |
| 2016/0121208 A1 | 5/2016 | Lockton et al. |
| 2016/0134947 A1 | 5/2016 | Huske et al. |
| 2016/0217653 A1 | 7/2016 | Meyer |
| 2016/0271501 A1 | 9/2016 | Balsbaugh |
| 2016/0361647 A1 | 12/2016 | Lockton et al. |
| 2016/0375362 A1 | 12/2016 | Lockton et al. |
| 2017/0036110 A1 | 2/2017 | Lockton et al. |
| 2017/0036117 A1 | 2/2017 | Lockton et al. |
| 2017/0043259 A1 | 2/2017 | Lockton et al. |
| 2017/0053498 A1 | 2/2017 | Lockton |
| 2017/0065891 A1 | 3/2017 | Lockton et al. |
| 2017/0098348 A1 | 4/2017 | Odom |
| 2017/0103615 A1 | 4/2017 | Theodospoulos |
| 2017/0128840 A1 | 5/2017 | Croci |
| 2017/0221314 A1 | 8/2017 | Lockton |
| 2017/0225071 A1 | 8/2017 | Lockton et al. |
| 2017/0225072 A1 | 8/2017 | Lockton et al. |
| 2017/0232340 A1 | 8/2017 | Lockton |
| 2017/0243438 A1 | 8/2017 | Merati |
| 2017/0249801 A1 | 8/2017 | Malek |
| 2017/0252649 A1 | 9/2017 | Lockton et al. |
| 2017/0259173 A1 | 9/2017 | Lockton et al. |
| 2017/0264961 A1 | 9/2017 | Lockton |
| 2017/0282067 A1 | 10/2017 | Lockton et al. |
| 2017/0296916 A1 | 10/2017 | Lockton et al. |

(56) References Cited

U.S. PATENT DOCUMENTS

| | | |
|---|---|---|
| 2017/0304726 A1 | 10/2017 | Lockton et al. |
| 2017/0345260 A1 | 11/2017 | Strause |
| 2018/0025586 A1 | 1/2018 | Lockton |
| 2018/0071637 A1 | 3/2018 | Baazov |
| 2018/0104582 A1 | 4/2018 | Lockton et al. |
| 2018/0104596 A1 | 4/2018 | Lockton et al. |
| 2018/0117464 A1 | 5/2018 | Lockton et al. |
| 2018/0140955 A1 | 5/2018 | Lockton et al. |
| 2018/0154255 A1 | 6/2018 | Lockton |
| 2018/0169523 A1 | 6/2018 | Lockton et al. |
| 2018/0190077 A1 | 7/2018 | Hall |
| 2018/0236359 A1 | 8/2018 | Lockton et al. |
| 2018/0243652 A1 | 8/2018 | Lockton et al. |
| 2018/0264360 A1 | 9/2018 | Lockton et al. |
| 2018/0300988 A1 | 10/2018 | Lockton |
| 2018/0318710 A1 | 11/2018 | Lockton et al. |
| 2019/0054375 A1 | 2/2019 | Lockton et al. |
| 2019/0060750 A1 | 2/2019 | Lockton et al. |
| 2019/0143225 A1 | 5/2019 | Baazov |

FOREIGN PATENT DOCUMENTS

| | | |
|---|---|---|
| CA | 2279069 | 7/1999 |
| CA | 2287617 | 10/1999 |
| EP | 0649102 A3 | 6/1996 |
| GB | 2364485 | 1/2002 |
| JP | 11-46356 | 2/1999 |
| JP | 11-239183 | 8/1999 |
| JP | 2000-165840 | 6/2000 |
| JP | 2000-217094 | 8/2000 |
| JP | 2000-358255 | 12/2000 |
| JP | 2001-28743 | 1/2001 |
| JP | 2000-209563 | 7/2008 |
| NZ | 330242 | 10/1989 |
| WO | 01/039506 A2 | 5/2001 |
| WO | 01/65743 A1 | 9/2001 |
| WO | 02/03698 A1 | 10/2002 |
| WO | 2005064506 A1 | 7/2005 |
| WO | 2006004855 | 1/2006 |
| WO | 2006004856 | 1/2006 |
| WO | 2007002284 | 1/2007 |
| WO | 2007016575 | 2/2007 |
| WO | 2007041667 | 4/2007 |
| WO | 2008027811 A2 | 3/2008 |
| WO | 2008115858 A1 | 9/2008 |

OTHER PUBLICATIONS

"Re: Multicast Based Voting System" www.ripe.net/ripe/maillists/archives/mbone-eu-op/1997/msg00100html.

"IST and Sportal.com: Live on the Internet Sep. 14, 2004 by Clare Spoonheim", www.isk.co.usk/NEWS/dotcom/ist_sportal.html.

"PurpleAce Launches 3GSM Ringtone Competition", www.wirelessdevnet.com/news/2005/jan/31/news6html.

"On the Perfomance of Protocols for collecting Responses over a Multiple-Access Channel", Mostafa H. Ammar and George N. Rouskas, IEEE INCOMFORM '91, pp. 1490-1499, vol. 3, IEEE, New York, NY.

Ducheneaut et al., "The Social Side of Gaming: A Study of Interaction Patterns in a Massively Multiplayer Online Game", Palo Alto Research Center, Nov. 2004, vol. 6, Issue 4, pp. 360-369.

Pinnacle, "The basics of reverse line movement," Jan. 19, 2018, Retrieved on Jan. 22, 2020, http://www.pinnacle.com/en/betting-articles educational/basics-of-reverse-line-movement/QAH26XGGQQS7M3GD.

Gambling Commission,"Virtual currencies, eSports and social casino gaming-position paper," Mar. 2017, Retrieved on Jan. 22, 2020, http://gamblingcomission.gov.uk/PDF/Virtual-currencies-eSports-and -social-casino-gaming.pdf.

Sipko et al.,"Machine learning for the prediction of professional tennis matches," In: MEng computing-final year project, Imperial College London, Jun. 15, 2015, http://www.doc.ic.ac.uk/teaching/distinguished-projects/2015/m.sipko.pdf.

Winview Game Producer, "Live TV Sports Play Along App WinView Games Announces Sponsorship With PepsiCo to Start This Holiday Season," in Winview Games. Dec. 21, 2016, Retrieved on Jan. 21, 2020 from , http://www. winviewgames./press-release/live-tv-sports-play-along-app-winview-games-announces-sponsorship-pepsico-start-holiday-season/.

The International Search Report and the Written Opinion for the PCT/US2019/054859 dated Feb. 4, 2020.

The International Preliminary Report dated Apr. 22, 2021 for the application PCT/US2019/054859.

Fantasy sport—Wikipedia.pdf, https://en.wikipedia.org/w/index.php?title=Fantasy_sport&oldid=685260969(Year:2015).

\* cited by examiner

METHOD OF AND SYSTEM FOR MANAGING CLIENT RESOURCES AND ASSETS FOR ACTIVITIES ON COMPUTING DEVICES

RELATED APPLICATION(S)

This Patent Application is a continuation of co-pending U.S. patent application Ser. No. 16/216,885, filed Dec. 11, 2018, entitled METHOD OF AND SYSTEM FOR MANAGING CLIENT RESOURCES AND ASSETS FOR ACTIVITIES ON COMPUTING DEVICES which is a continuation-in-part of U.S. patent application Ser. No. 14/997,352, filed on Jan. 15, 2016, entitled METHOD OF AND SYSTEM FOR MANAGING CLIENT RESOURCES AND ASSETS FOR ACTIVITIES ON COMPUTING DEVICES which is a continuation of U.S. patent application Ser. No. 14/260,480, filed on Apr. 24, 2014, entitled METHOD OF AND SYSTEM FOR MANAGING CLIENT RESOURCES AND ASSETS FOR ACTIVITIES ON COMPUTING DEVICES which is a continuation of U.S. patent application Ser. No. 11/472,241, filed on Jun. 20, 2006, entitled METHOD OF AND SYSTEM FOR MANAGING CLIENT RESOURCES AND ASSETS FOR ACTIVITIES ON COMPUTING DEVICES, now U.S. Pat. No. 8,738,694, which claims priority under 35 U.S.C. § 119(e) of the co-owned U.S. Provisional Patent Application No. 60/692,356, filed Jun. 20, 2005, and entitled SYSTEMS AND METHODOLOGIES ENABLING A CELL PHONE BASED SUBSCRIPTION SERVICE OFFERING A VARIETY OF SCHEDULED GAMES IN CONNECTION WITH LIVE TELEVISION PROGRAMMING" which are also all hereby incorporated by reference in their entirety.

This application is related to co-pending U.S. patent application Ser. No. 11/298,901, filed on Dec. 9, 2005 and entitled "A GAME OF SKILL PLAYED BY REMOTE PARTICIPANTS UTILIZING WIRELESS DEVICES IN CONNECTION WITH A COMMON GAME EVENT" and co-pending U.S. patent application Ser. No. 11/166,596, filed on Jun. 24, 2005 and entitled "METHODS AND APPARATUS FOR DISTRIBUTED GAMING OVER A MOBILE DEVICE" which claims priority under 35 U.S.C. § 119(e) of the co-pending U.S. Provisional Patent Application Ser. No. 60/588,273, filed Jul. 14, 2004 and entitled "A METHODOLOGY FOR PROVIDING ALL CONTESTANTS IN GAMES OF SKILL PLAYABLE ON CELL PHONES WITH THEIR CURRENT STANDING WHILE RECEIVING GAME CONTROL INFORMATION ONE-WAY VIA A 'BROADCAST' TRANSMISSION," which are all incorporated by reference in their entirety.

FIELD OF THE INVENTION

The present invention relates to the field of distributed entertainment. More specifically, the present invention relates to the field of distributed entertainment utilizing a computing device where the entertainment corresponds to an event.

BACKGROUND OF THE INVENTION

In the United States alone there are over 170 million registered cell phones. With the expiration of the U.S. Pat. No. 4,592,546 to Fascenda et al., companies are able to now use the cell phone and other mobile communication devices utilizing a multicast network to control television viewers in games of skill based upon predicting, for example, what the quarterback may call on the next play. In addition, games of skill with a common start time can be conducted simultaneously among cell phone owners, based on classic card, dice, trivia, and other games. In order to avoid the anti-gaming laws in the various states, elements of chance must be virtually non-existent in such games and the winners therefore determined by the relative skill, experience and practice of the player in each discrete game. In certain jurisdictions and under certain circumstances, simultaneous games of chance can be conducted using the same technology as games of skill.

Although the ability to play games and enjoy other activities corresponding to current events on cell phones exists, there are a number of issues regarding coordinating the games across a nationwide network. Cellular networks and other networks are only able to handle a limited amount of traffic, so when millions of participants utilize the network at the same time for a regularly scheduled event, there are concerns of the network being overloaded and bogged down to a point where users do not receive necessary data in a timely manner.

Furthermore, cell phones and other computing devices have their own limitations as well. Although cell phone memory is increasing as is typical with technology, cell phones still have a limited amount of memory. Moreover, many users still have somewhat older cell phones that have less memory than current models. In addition to the memory limitations, there are multiple cell phone service providers and a plethora of cell phone models using slightly different protocols. Cell phone users are also sensitive to the time it takes to download the necessary data to play games or enjoy activities.

Servers of the entertainment provider also have limited resources yet must be able to ensure the potentially millions of simultaneous users have the necessary and proper software resident on their cell phones in order to participate in scheduled interactive programs. Again, servers are continuously growing more powerful, quicker and more stable; however there is still potential to overload a server with excessive traffic.

Additionally, other aspects of a nationwide service generate potential issues such as multiple time zones, differing timing and channels of television programs and separate state laws.

SUMMARY OF THE INVENTION

A method of and system for enabling a distributed entertainment system over a computing device is described herein. When implementing a distributed entertainment system wherein the entertainment system is directly correlated to live events or televised programs, there are a number of issues that must be addressed such as differing timing and channels of television programs and separate state laws. Furthermore, there are a plethora of varying computing device models possibly requiring model-specific software. An "Activity Client" is provided to handle such concerns. Furthermore, since time is of the essence for activities based on live or televised events, it is necessary to ensure a computing device is able to receive the necessary updates for the program before the event begins. By providing only the needed components instead of entire data packages, the present invention is able to much more efficiently prepare users' computing devices in time.

In one aspect, a method of implementing an entertainment service on computing devices comprises downloading an activity client to a computing device, loading a set of event information to the activity client, selecting an event to participate in from a list of possible events, downloading a set of activity-specific information from a server to the computing device and executing an application corresponding to the event on the computing device. The activity client is a program for managing activity information and data. The method further comprises selecting and registering with a television-related service. The method further comprises identifying a user status. Identifying the user status includes identifying a geographic location of the computing device. The activity client is specifically designed for the computing device. Executing the application is in real-time, synchronized with the event. The set of event information includes a schedule of available events. The schedule of available events includes a name of a television event, identification of an activity to be played with the television event, a television network and local channel offering the television event, a duration of the television event and information relating to nature of a prize related to the television event. The method further comprises displaying the set of event information. The set of event information is continually broadcast from the server and received at the computing device. The set of activity-specific information includes activity-specific instructions and information related to nature of the activity and event. An activity interpreter resident in the activity client is used to execute the application. The activity interpreter combines the activity, event and device instructions to execute the activity in real-time. The application is selected from the group consisting of a game, a survey and a poll. The computing device is a wireless device. The computing device is selected from the group consisting of a set-top box, a personal computer, a gaming console, a laptop computer, a cell phone, a PDA and a combination device. The method further comprises receiving a list of assets from the server, comparing the list of assets with a first set of assets on the computing device and receiving only a second set of assets within the list of assets that are not already resident on the computing device. The method further comprises improving efficiency by prioritizing the second set of assets. The second set of assets are grouped into a set of necessary assets and a set of preferred assets.

In another aspect, a method of receiving data on a client device to participate in a specific interactive event comprises receiving a list of assets from a server, comparing the list of assets with the assets on the client device and receiving only the assets within the list of assets that are not already resident on the client device. The method further comprises selecting an activity corresponding to an event from a menu of events. The activity is a game. The method further comprises requesting the list of assets from the server that are required to participate in the specific interactive event. The list of assets are sent from the server. The method further comprises requesting the assets not already on the client device. The method further comprises improving efficiency by prioritizing the assets. The assets are grouped into a set of necessary assets and a set of preferred assets. The client device is a wireless device. The client device is selected from the group consisting of a set-top box, a personal computer, a gaming console, a laptop computer, a cell phone, a PDA and a combination device.

In another aspect, a method of receiving data on a client device to participate in a specific interactive event comprises sending a request to a server from a client device to retrieve assets needed for an activity and concurrently sending a list of the assets currently resident on the client, comparing the list of resident assets sent by the client with a previously generated list of assets on the server and downloading a packet customized for the client containing only the assets missing on the client. The method further comprises improving efficiency by prioritizing the assets. The assets are grouped into a set of necessary assets and a set of preferred assets. The client device is a wireless device. The client device is selected from the group consisting of a set-top box, a personal computer, a gaming console, a laptop computer, a cell phone, a PDA and a combination device.

In yet another aspect, a system for receiving data to participate in a specific interactive event comprises a server and a client device coupled to the server for receiving a set of activity-specific data from the server wherein the client device comprises a memory for storing an activity client. The activity client is a program for managing activity information and data. The activity client further comprises an activity interpreter. A list of assets are utilized to determine which assets are downloaded to the activity client. A set of necessary assets are downloaded to the client device. The client device is a wireless device. The client device is selected from the group consisting of a set-top box, a personal computer, a gaming console, a laptop computer, a cell phone, a PDA and a combination device.

In another aspect, a client device comprises a communication interface, an activity client for receiving activity information through the communication interface and a display for displaying the activity information received by the activity client. The activity client is a program for managing activity information and data. The activity client further comprises an activity interpreter. The activity client receives a set of assets related to an application. The application is selected from the group consisting of a game, a survey and a poll. A list of assets are utilized to determine which assets are downloaded to the activity client. Only a set of necessary assets are downloaded to the activity client. The client device is selected from the group consisting of a set-top box, a personal computer, a gaming console, a laptop computer, a cell phone, a PDA and a combination device. The activity information comprises a schedule of upcoming events, is device-specific, is geographic-specific and is activity-specific. A user navigates and selects an event from the schedule of upcoming events.

In another aspect, a server device is configured to communicate with client devices in a plurality of locations wherein the server device provides location-specific activity information to the client devices, wherein the client devices each store an activity client. The server device comprises a communications interface for communicating with the client devices, an asset module for determining which assets each client device needs and a distributing module for sending the assets needed to each client device. The activity client is a program for managing activity information and data. The activity information comprises a schedule of upcoming events. The schedule of upcoming events is activity-specific. The schedule of upcoming events is device-specific. A user navigates and selects an event from the schedule of upcoming events. The server device stores a list of assets required for the client devices to run an application. The server device sends the list of assets to the client devices. The server device sends only requested assets for each client device of the client devices. The server device compares the list of assets with a list of client assets after each client device of the client devices sends the list of client assets to the server device. The server device sends only assets in the list of assets that are not in the list of client assets for each client device of the client devices.

DETAILED DESCRIPTION OF THE PREFERRED EMBODIMENT

Figure 1:
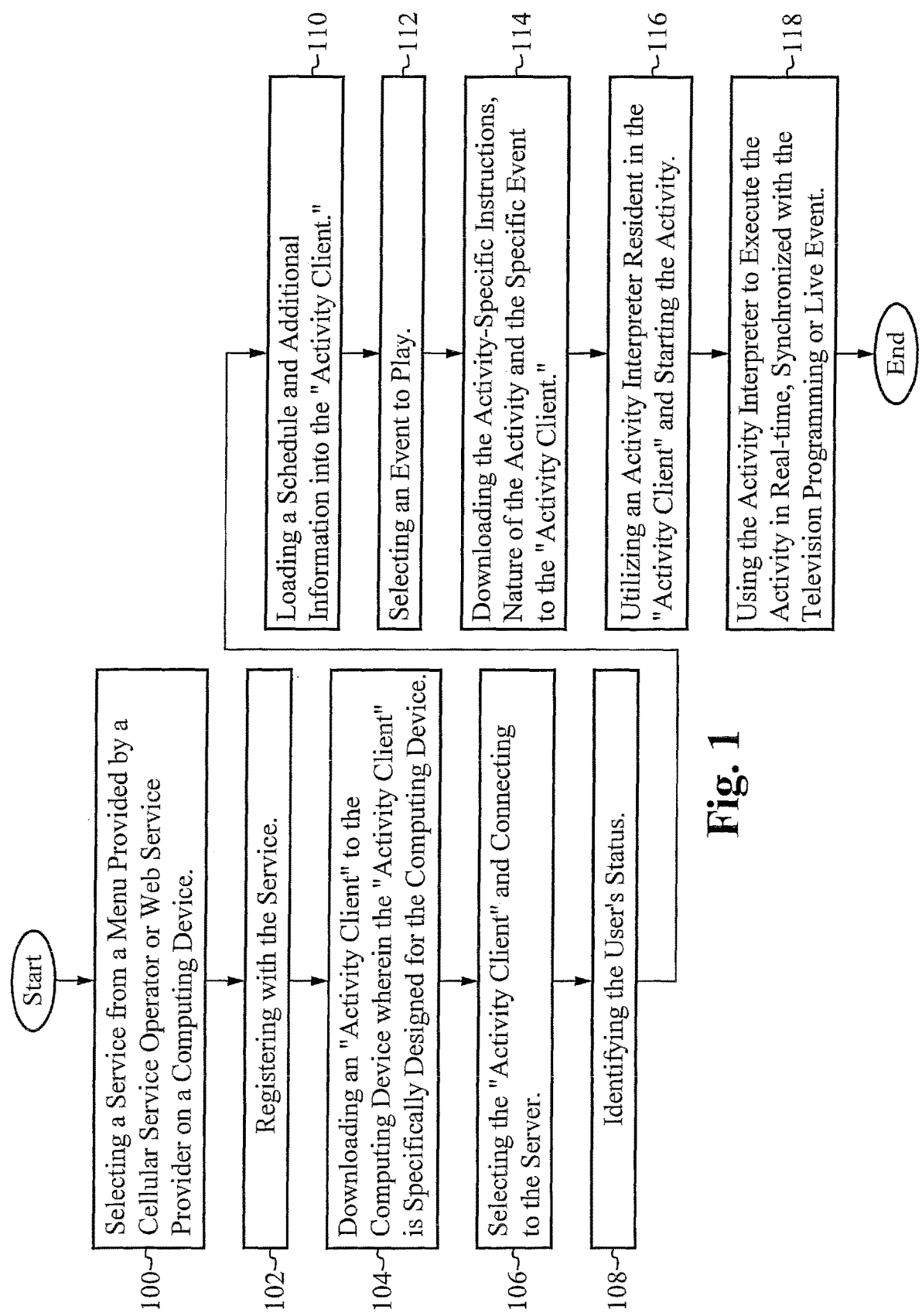
FIG. 1 illustrates a flowchart of an embodiment of utilizing an "Activity Client" to ensure a cell phone or other computing device is properly configured.

A system for and method of implementing a nationwide entertainment service on computing devices and handling the issues described above are described herein. In some embodiments, the entertainment service is subscription-based. The computing devices include, but are not limited to, set-top boxes, personal computers, gaming consoles, laptop computers, cell phones, PDAs and combination devices such as cell phone/mp3 players.

There are over 200 separate television programming areas across the country. The programming offerings available depend on each individual's physical location. There are hundreds of different printed versions of the "TV Guide," and the same television programs will be viewed at different times and on different television channels depending on what Designated Market Area (DMA) a consumer is located in. Thus, the schedule of events for one person might be entirely different from another person located just a few miles away. Monthly and trial subscribers must be informed in advance which television programs will have games or other activities offered by the service concurrent with their telecast. For example, Jeopardy might start at 4 PM ET on Channel 7 in San Francisco, but in Chicago it starts at 6 PM ET on Channel 5, and 7 PM ET on Channel 13 in New York.

Furthermore, the schedules are continuously changing. The activity schedule changes often and must be updated by adding new activities as well as dropping activities which are based on TV programs that have finished airing or are too far into the program to allow entry.

Immediate entry into activities is also required, since time is of the essence in getting all of the required information processed and downloaded to the client. Moreover, since many contests or competitions are of short duration, a competitor might be put at a disadvantage if opportunities to earn points which determine the winners of prizes are missed at the start of the contest, therefore users must be permitted entry possibly seconds before the beginning of a contest, specifically a TV program-based contest. For other activities, such as surveys, time is not necessarily of the essence, but it is still beneficial to users, if they do not have long wait times before participating in an activity. As is described further below, an improved method is described to ensure users have the necessary components of the activity application residing in the memory of the cell phones or computing devices in time to play an activity from its beginning.

The legality of awarding prizes is based on 50 separate state laws. For example, Nevada and Utah have very different gaming laws. When games of skill are offered, each state's laws will define what constitutes a legal game of skill. The same game playable for prizes by a user at one location is not necessarily legal for a user across a state line which might be across the street. It is incumbent upon the entertainment service operator to abide by the laws in each of the jurisdictions where it has users.

Different software is occasionally needed for different makes and models of computing devices such as cell phones. A nationwide entertainment service has a universe of potential users who will utilize a wide variety of makes and models of cell phones. Many of these devices will have different capabilities and requirements regarding display, memory, user interface, and other technical requirements to operate the software necessary to provide such an entertainment service. Therefore, slightly different software is likely required for each separate make and model of a user's device.

A typical subscriber is able to play dozens of different TV-related activities in a week, including football, baseball, Wheel of Fortune™, The Apprentice™ and others. Most makes and models of cell phones have significant limitations on the amount of useable memory for storing downloadable application software. Therefore, a subscriber's cell phone should not be expected to hold in the temporary or permanent memory all of the software capable of running dozens of separate and discreet activity applications which might be offered by such an entertainment service. Minimizing and managing the amount of memory required to fully enjoy the entertainment service is essential.

The present invention utilizes a software application, referred to as an "Activity Client." The "Activity Client" is retained in a user's computing device's memory. A variety of methodologies are implemented for downloading the "Activity Client" into memory of the cell phone or other computing device utilized. In an embodiment, the "Activity Client" is preloaded prior to purchase by a manufacturer or carrier. In an alternative embodiment, in order to initiate the service, a subscriber once registered, selects the company's "Activity Client" from a menu on the cell phone or other computing device from a list of activities, games and other entertainment services offered by a wireless service provider such as Verizon™ Wireless or Sprint™. In some embodiments, if the activity is to be participated other than on a trial basis, registration and billing arrangements with the service will be accomplished either on the company's internet site, or by inputting registration information utilizing the cell phone or other computing device.

Upon selecting the company's service from this menu, a data connection is made to either the cellular service provider or the company's server, and the "Activity Client" is downloaded to the user's cell phone or other computing device. An example protocol implemented is TCP. In the cell phone embodiment, the process of downloading the "Activity Client" is similar to the current methods whereby discrete cell phone activities are selected, downloaded, and previewed or purchased.

In some embodiments, the downloaded "Activity Client" resides in the cell phone's compact flash memory. When the user subsequently launches the "Activity Client" on his/her cell phone or other computing device, a data connection is made to a server. After the user is authenticated and their entitlement level has been determined, the authorized and geographic-specific schedule of events is sent down to his/her phone. Using this approach, the schedule is continuously updated while the "Activity Client" is active.

The "Activity Client" in its default mode, utilizes the LCD on the cell phone to display the entertainment beginning with the next scheduled activities yet to start, generally on the half hour. Since the registration process provides the service provider with the make and model of each user's phone, all "Activity Client" downloads are specific for that phone and service. Thus, for example, if a user downloads the "Activity Client" to his Samsung phone on a Verizon Wireless network, subsequent downloads to that phone will function properly as they are specifically designed for that phone.

To address the issue of numerous programming areas across the country, in one embodiment, the legally mandated ability of the cellular networks to accurately identify the physical location of every cell phone is utilized. Alternatively, and when using computing devices other than a cell phone, other information is utilized to locate the user, such as area code, zip code, or the billing address provided by the user. Based on the information acquired or provided, the server selects the specific schedule of activities, along with start times and TV channel designation for the location for this particular user. The scheduling information is downloaded into a template residing in the "Activity Client." For example, a user located in the Indianapolis, Ind. television DMA might receive a schedule which includes 9:00 pm Monday Night Football, ABC, Channel 13.

In an alternative embodiment, another methodology is utilized wherein specific scheduling information is continually broadcast to all of the users' phones, either utilizing SMS messages to "wake" the phone or, by utilizing a 3G "always on" multicast to update the schedule continually without user intervention, as long as the user's telephone is powered on.

The server, when determining the location of the cell phone, also accesses information concerning each specific activity offered as to whether or not it has been determined that the activity meets the applicable state law requirements of the game of skill for each particular participant. The user is then informed as to whether or not a prize will be offered to the competitors in this activity from their location.

In addition to containing software for enabling the continual receipt and updating of schedules and activity playing information specific to each user's geographic location, the "Activity Client" has the ability to receive and hold downloaded activity-specific data instructions from the server. Thus, when a specific activity is selected for play by the user, for example, Monday Night Football™, Wheel of Fortune™, or Major League Baseball™, the server downloads the activity-specific instructions into a memory space provided for this purpose in the "Activity Client." These activity-specific data instructions are based on the specific genre such as football, specific event such as San Francisco 49ers vs Dallas Cowboys and the specific computing device such as a wireless mobile device such as Sanyo™ 4300. Thereafter, the specific activity instructions temporarily reside inside the "Activity Client" until the next activity playing session, where it is replaced by different activity-specific data instructions selected by the user.

In an alternative embodiment, the system described herein is used to schedule and control duplicate activities of skill or chance with a common scheduled start time, played simultaneously, which are self contained, for example, not related to a television program. Examples of such include a trivia game, or classic card, dice, word games or games based on television clips.

FIG. 1 illustrates a flowchart of an embodiment of utilizing an "Activity Client" to ensure a cell phone or other computing device is properly configured. In the step 100, a user selects from a menu provided by his web service provider or cellular service operator, for example, Verizon Wireless™, Cingular™, or Sprint™, the TV related subscription service or other service. In the step 102, the user registers with the subscription service when necessary. For some activities, registration is required, but for others, registration is optional or not even available. After registration, if necessary, the user receives a downloaded "Activity Client" into his cell phone or other computing device, specific to the device's make and model in the step 104. In the step 106, to access the entertainment service, the "Activity Client" is selected by the user from the menu, and the device connects via the cellular network and/or Internet to the service provider's server. Alternatively, after the "Activity Client" is downloaded, the device automatically connects to the server. In the step 108, the server identifies the user's status as a "trial" subscriber, "ad hoc" competitor, or "full monthly" subscriber, and identifies the specific geographic location of the user. In the step 110, a current schedule of all available events, by name of event, TV network and channel offered, duration of event, and the nature of the prize, and where appropriate, information that indicates that the activity is able to be played for a prize in the user's locale or not, is loaded into the "Activity Client" and displayed on the device's LCD. In an alternative embodiment, once the "Activity Client" is resident on the user's device, scheduling information is continually "pushed" or "broadcast" and passively received and updated on the "Activity Client" so that it is instantly accessed, current and up to the minute. In the step 112, the user selects the event he/she desires to play along with from a variety of possibilities presented on the device. In the step 114, the "Activity Client" software connects to the company's server, and the activity-specific instructions for a specific device, the nature of the activity, and the specific event are downloaded into the "Activity Client." In the step 116, the "Activity Client" then utilizes the activity interpreter resident in the "Activity Client" and starts the activity application. In the step 118, the activity interpreter that resides in the "Activity Client" combines the activity, event, and device instructions and uses these data instructions to execute the activity application as it unfolds in real-time, synchronized with the television programming or live event being viewed by the user.

Additionally, managing different types of software assets or components required by different models of computing devices such as cell phones offered by a variety of cellular carriers or web service providers is described herein. To successfully participate in an activity of skill, based on a television show or live event, a user's cell phone needs specific software to manage, for example, the images displayed on the LCD display, the sound effects utilized by the activity, the activity scripts, the advertising copy and images which are displayed interstitially during the activity, and event-specific data generated in real-time and synchronized with the unfolding of a television show or live event. Complexity is further compounded by the fact that the assets change in minor or major part from activity to activity. For example, from football to baseball to Jeopardy™, there are changes to these assets. Some cellular phones are able to retain some or all of the assets in the phone's memory if the activity to be played was the last activity partaken by a user. Other phones retain some or part of the assets which are common to different genres of activities. Yet other phones retain none of the assets. For example, a first time user or frequent user whose assets were replaced by an upload for a different genre of activity would likely have none of the assets.

Regardless of what type of device is used and on whichever service, the present invention ensures that the application in each user's device receives all of the specific assets necessary for that particular genre of activity for a specific scheduled event while minimizing capacity and latency issues by assuring that only the necessary assets which are not resident on the device for the event are delivered on a timely basis to each cell phone. By using an implementation that only sends necessary missing data, less information needs to be transferred therefore there is less traffic congestion, and users are able to receive the necessary components on time.

Although a cell phone is used in the example above, the present invention is not limited to cell phones. As described above and below, the present invention is applicable to a variety of computing devices in addition to cellular telephones.

Figure 2:
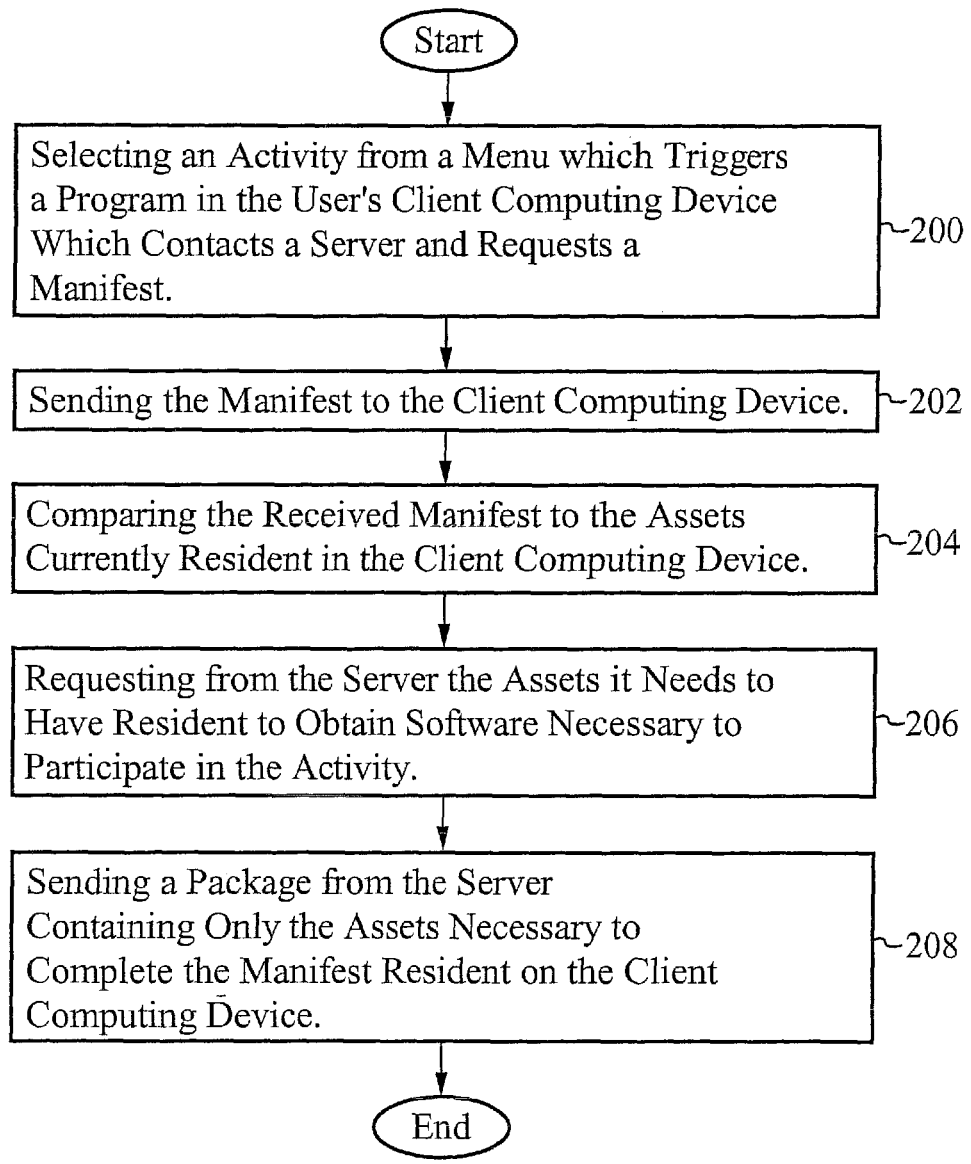
FIG. 2 illustrates a flowchart of an embodiment of implementing a manifest to determine needed assets for a client computing device.

FIG. 2 illustrates a flowchart of an embodiment of implementing a manifest, which is a list of assets, to determine needed assets for a client computing device. In the step 200, a user selects an activity from a menu which triggers a program in the user's client computing device which contacts a server and requests a manifest of assets, from the server, that are required to participate in a specific interactive event. The server then sends the manifest to the client, in the step 202. In the step 204, the client then compares the received manifest to the assets currently resident in the computing device. The client then requests from the server the assets it needs to have resident in the client to obtain a full compliment of required software necessary to participate in the activity, in the step 206. The server then sends a package containing only the assets necessary to complete the manifest resident on the client computing device in the step 208.

Figure 3:
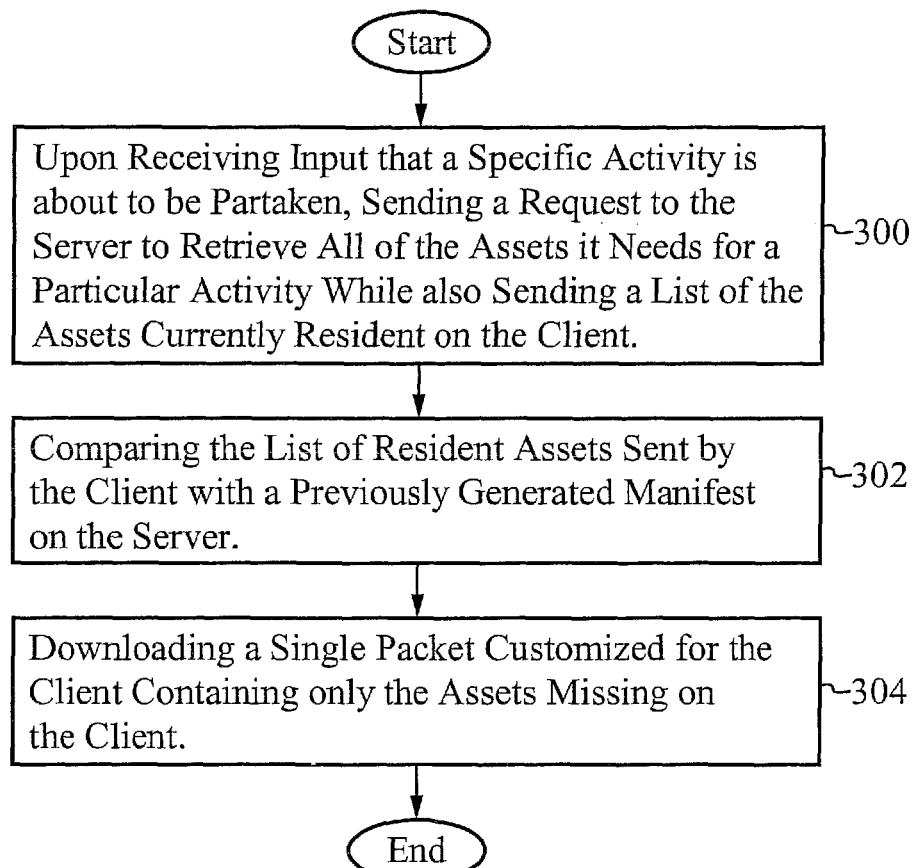
FIG. 3 illustrates a flowchart of an alternative embodiment of implementing a manifest to determine needed assets for a client computing device.

FIG. 3 illustrates a flowchart of an alternative embodiment of implementing a manifest to determine needed assets for a client computing device. Upon receiving input that a specific activity is about to be undertaken, the client sends a request to the server to retrieve all of the assets it needs for a particular activity while also sending a listing of the assets currently resident on the client, in the step 300. The server having previously generated the manifest for the event, then compares the list of resident assets sent with the request in the step 302, and then downloads a single packet customized for the client containing only the assets missing on the client, in the step 304.

Figure 4:
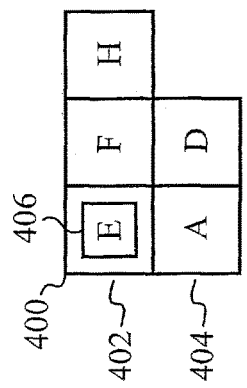
FIG. 4 illustrates an exemplary manifest of the present invention.

FIG. 4 illustrates an exemplary manifest of the present invention. Assets listed in a manifest 400, range in necessity from those that are absolutely required to those that are preferable. To further improve efficiency when delivering components to a user's computing device, the manifest 400 is able to prioritize the assets for the client device to resolve. In some embodiments, the manifest groups the assets into two sets of assets: a first set 402 of required assets and a second set 404 of preferable assets. Furthermore, the assets within each group are able to be ordered utilizing priorities ensuring that the most important assets in the group are first. For example, the server sends the following list of assets required for an event—A, D, and (E, F and H). The assets (E, F and H) are grouped in the response so that the client knows that at least one of them is necessary for the client to join the event. Additionally, the order in which the assets are listed is able to provide additional information to the client device about their priority. For instance, in the example above, the asset E is the most preferred asset 406, then F and finally H within the first set 402 of required assets. If the client has none of the assets, it is able to only request E, depending on the current constraints such as time remaining before the start of the event, the size of the memory on the client device and other similar considerations. Although the manifest used in the example above only has two levels and five total assets, the size of the manifest is able to be modified as desired. If three levels of groupings are preferred, then that hierarchy is able to be implemented. Furthermore, more or less than five assets are able to be included within the manifest, as appropriate.

By minimizing the amount of temporary memory utilized for each application in the client, the time necessary to load the software to play an event is decreased, and the memory of each client is used more efficiently. Thus, the server is able to minimize this overhead by only sending the assets which the client specifically needs for a specific application at a specific time. In one embodiment, the client is provided flexibility in terms of managing the assets it needs for the activities. In another embodiment, the processing that needs to be performed by the client is minimized.

Figure 5:
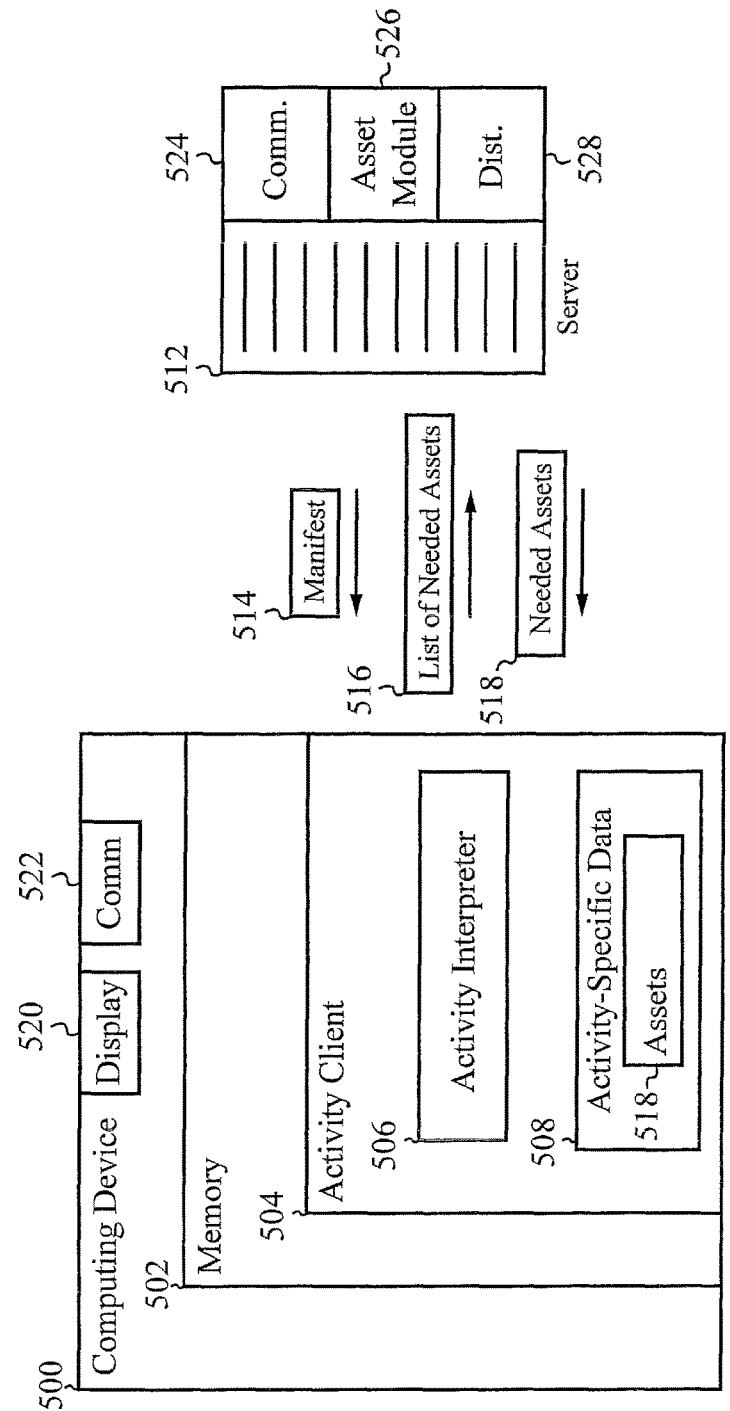
FIG. 5 illustrates a block diagram of an embodiment of the present invention.

FIG. 5 illustrates a block diagram of an embodiment of the present invention. A computing device 500 such as a set-top box, personal computer, gaming console, laptop computer, cell phone, PDA or combination cell phone/mp3 device includes a memory 502 for storing data. As described above, the memory 502 varies in size depending on the type and brand of computing device, where more recently produced computing devices have larger memories and are thus able to store more data. However, older computing devices only store a minimal amount of data. Within the memory an "Activity Client" 504 is stored for receiving activity-specific data 508. The activity-specific data 508 includes instructions for a specific computing device, the nature of the activity and the specific event. By utilizing a manifest 514 received from a server 512, wherein the manifest 514 includes assets for running the activity, the computing device 500 is able to efficiently retrieve the activity-specific data 508. A list of needed assets 516 by the computing device 500 is sent from the computing device 500 back to the server 512. Then, the necessary assets 518 are downloaded to the memory 502 of the computing device 500. An activity interpreter 506 within the "Activity Client" utilizes the activity-specific data 508 to start the activity application by combining the activity, event and device instructions and executing the activity in real-time. The computing device 500 also includes a display 520, a communication interface 522 and other standard components necessary for proper functionality. The server 512 also includes a communications interface 524 for communicating with the client device 500, an asset module 526 for determining which assets the client device 500 needs and a distributing module 528 for sending the assets needed to the client device 500.

The present invention is applicable to any communicating computing devices such as set-top boxes, personal computers, gaming consoles, laptop computers, cell phones, PDAs and combination devices such as cell phone/mp3 players. The computing devices must have access to a network, but are able to be wired or wireless. The computing devices also are able to be mobile or stationary. Furthermore, the network is able to include a cellular network, a web-based network or any other information sharing network.

The activities that are able to be participated in utilizing the present invention include, but are not limited to, games, polls, surveys, and other interactive activities.

In one specific embodiment, a user utilizes a wireless device, such as a cell phone to subscribe to an interactive gaming service. The user then registers with the service and downloads an "Activity Client" into the cell phone where the "Activity Client" is specifically configured for that type of cell phone. Then, the cell phone connects through the cellular network and Internet to a game server. The game server identifies the user's status including the specific geographical location. A current schedule of all available events, by name of TV event, identification of the game to be played with the TV event, TV network and channel offered, duration of event, and the nature of the prize is then downloaded to the "Activity Client." After a user views the schedule and other information, the user is able to select the event they want to play along with. Then, the "Activity Client" connects to the game server and game-specific data is downloaded. In instances where some of the game-specific data is already downloaded in the cell phone's memory, only those assets that are not already there are downloaded. Preferably, necessary assets are downloaded first and then preferred assets are downloaded. This ensures that a user will be able to play along with the game on time. Then, the "Activity Client" utilizes the game interpreter resident to start the game. The game interpreter also combines the game, event and device instructions to execute the game in real-time while synchronized with the television programming.

The present invention is also intended to apply to any kind of application software which utilizes a variety of assets, where some of the assets are maintained on a remote server such as playing video games, listening to music and web browsing.

To utilize the present invention, a user has a computing device, such as a cell phone, or other appropriate computing device with which he is able to subscribe to an interactive entertainment service. The user then registers with the service and downloads an "Activity Client" into the computing device where the "Activity Client" is specifically configured for that type of device. Then the computing device connects through to a server. The server identifies the user's status including the specific geographical location. A current schedule of all available events, by name of TV event, identification of the activity to be played with the TV event, TV network and channel offered, duration of event, and the nature of the prize is then downloaded to the "Activity Client." After a user views the schedule and other information, the user is able to select the event they want to play along with. Then, the "Activity Client" connects to the server and activity-specific data is downloaded. In instances where some of the activity-specific data is already downloaded in the computing device's memory, only those assets that are not already there are downloaded. Preferably, necessary assets are downloaded first and then preferred assets are downloaded. This ensures that a user will be able to play along with the activity on time. Then, the "Activity Client" utilizes the activity interpreter resident to start the activity. The activity interpreter also combines the activity, event and device instructions to execute the activity in real-time while synchronized with the television programming.

In operation, a user is able to use his cell phone or other computing device to enjoy interactive entertainment. For example, the user scrolls through the menus and selects the interactive entertainment desired to be played. Thereafter, downloads occur, and instructions and options are displayed on the display so that a user is able to read about and determine which interactive entertainment he wants to play. After selecting the activity, again further downloads occur to ensure the proper components are installed on the user's computing device. For example, if it is a Sunday afternoon at 12:50 PM PT, and a user in San Francisco, Calif. sees that the San Francisco 49ers are playing the Oakland Raiders at 1:00 PM PT, he is able to select that activity to play. The user also watches the activity on television. In other embodiments, the activity is watched on other devices such as a computer, the cell phone or computing device itself, or live. At 1:00 PM PT, when the activity starts, the user is able to interactively play along with what he is viewing by predicting aspects of the activity.

Although a cell phone has been used throughout the present specification as the main exemplary computing device, it should be understood that any computing device is able to be used within the described method and system.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of implementing a consumer service on a mobile Internet-connected computing device comprising:
   loading a set of service related information located on a server to an activity client;
   selecting an option from the activity client from a list of available options;
   downloading a set of service-specific information related to a selected option from the server to the mobile Internet-connected computing device;
   executing an application related to the selected option within the activity client on the mobile Internet-connected computing device;
   receiving a list of assets necessary for executing the application from the server, wherein the assets necessary for executing the application directly affect the operation of the application;
   comparing the list of assets with a first set of assets on the mobile Internet-connected computing device; and
   receiving only a second set of assets within the list of assets that are not already resident on the mobile Internet-connected computing device.

2. The method of claim 1 wherein receiving only the second set of assets within the list of assets that are not already resident on the mobile Internet-connected computing device is by determining a last activity participated in by the user or a genre of the last activity participated in by the user.

3. The method of claim 1 further comprising improving efficient utilization of memory capacity by prioritizing the second set of assets.

4. The method of claim 1 wherein the second set of assets are grouped into a set of necessary assets and a set of preferred assets.

5. The method of claim 1 wherein a geographic location of the mobile Internet-connected computing device determines the set of service related information to be loaded, wherein the set of service related information includes service related information which is relative to and dependent on the geographic location of the mobile Internet-connected computing device.

6. The method of claim 5 wherein as the geographic location of the mobile Internet-connected computing device changes, different service related information is presented within the application based on the geographic location.

7. The method of claim 6 wherein the geographic location of the mobile Internet-connected computing device is determined using one or more cellular networks, GPS, GSM or other related technologies.

8. The method of claim 1 wherein the information based on the geographic location utilizes past usage of a user in connection with the geographic location.

9. The method of claim 1 wherein the server is located remotely from the mobile Internet-connected computing device.

10. The method of claim 1 wherein the assets are prioritized by frequency of use by a user.

11. The method of claim 1 wherein the assets are prioritized based on prior usage by a plurality of users.

12. The method of claim 1 wherein the assets are prioritized based on user selected parameters.

13. The method of claim 12 wherein the parameters are determined by a sponsor or advertiser of the consumer service.

14. The method of claim 1 wherein the assets are prioritized by a service provider of the consumer service.

15. The method of claim 1 wherein the assets are prioritized based on legal requirements at a current location of a user.

16. The method of claim 1 wherein the assets are prioritized based on a user profile maintained on the server.

17. The method of claim 1 wherein the assets are delivered based on a current state of the consumer service.

18. The method of claim 1 further comprising replacing unused assets to manage memory on the mobile Internet-connected computing device.

19. The method of claim 1 further comprising purging unused assets to manage memory on the mobile Internet-connected computing device.

20. A method of implementing a consumer service with a server comprising:
transmitting a set of service related information to an application;
receiving a selection related to the consumer service;
transmitting a set of selection information related to the selection from the server to a mobile Internet-connected computing device;
receiving additional information based on a user's execution of the application on the mobile Internet-connected computing device;
transmitting a list of assets necessary for executing the application, wherein the assets necessary for executing the application directly affect the operation of the application; and
transmitting only a second set of assets within the list of assets that are not already resident on the mobile Internet-connected computing device.

21. The method of claim 20 wherein transmitting only the second set of assets within the list of assets that are not already resident on the mobile Internet-connected computing device is by determining a last activity participated in by the user or a genre of the last activity participated in by the user.

22. The method of claim 20 further comprising comparing the list of assets with a first set of assets on the mobile Internet-connected computing device.

23. The method of claim 20 further comprising comparing the list of assets with a first set of assets on the server.

24. The method of claim 20 further comprising improving efficient utilization of memory capacity by prioritizing the second set of assets.

25. The method of claim 20 wherein the second set of assets are grouped into a set of necessary assets and a set of preferred assets.

26. The method of claim 20 wherein the geographic location of the mobile Internet-connected computing device determines the set of service related information to be transmitted, wherein the set of service related information includes service related information which is relative to and dependent on the geographic location of the mobile Internet-connected computing device.

27. The method of claim 26 wherein as the geographic location of the mobile Internet-connected computing device changes, different service related information is presented within the application based on the geographic location.

28. The method of claim 27 wherein the geographic location of the mobile Internet-connected computing device is determined using one or more cellular networks, GPS, GSM or other related technologies.

29. The method of claim 20 wherein the information based on the geographic location utilizes past usage of a user in connection with the geographic location.

30. The method of claim 20 wherein the server is located remotely from the mobile Internet-connected computing device.

31. The method of claim 20 wherein the assets are prioritized by frequency of use by a user.

32. The method of claim 20 wherein the assets are prioritized based on prior usage by a plurality of users.

33. The method of claim 20 wherein the assets are prioritized based on user selected parameters.

34. The method of claim 33 wherein the parameters are determined by a sponsor or advertiser of the consumer service.

35. The method of claim 20 wherein the assets are prioritized by a service provider of the consumer service.

36. The method of claim 20 wherein the assets are prioritized based on legal requirements at a current location of a user.

37. The method of claim 20 wherein the assets are prioritized based on a user profile maintained on the server.

38. The method of claim 20 wherein the assets are delivered based on a current state of the consumer service.

39. The method of claim 20 further comprising replacing unused assets to manage memory on the mobile Internet-connected computing device.

40. The method of claim 20 further comprising purging unused assets to manage memory on the mobile Internet-connected computing device.

41. A server device comprising:
a memory configured to store an application, the application configured to:
transmit a set of service related information to a mobile device application;
receive a selection related to a consumer service;
transmit a set of selection information related to the selection from the server to a mobile Internet-connected computing device;
receive additional information based on a user's execution of the mobile device application on the mobile Internet-connected computing device;
transmit a list of assets necessary for executing the consumer service, wherein the assets necessary for executing the consumer service directly affect the operation of the consumer service; and transmit only a second set of assets within the list of assets that are not already resident on the mobile Internet-connected computing device; and
a processor configured to process the application.

42. The server device of claim 41 wherein only the second set of assets within the list of assets that are not already resident on the mobile Internet-connected computing device are transmitted by determining a last activity participated in by the user or a genre of the last activity participated in by the user.

43. The server device of claim 41 wherein the application is further configured to compare the list of assets with a first set of assets on the mobile Internet-connected computing device.

44. The server device of claim 41 wherein the application is further configured to compare the list of assets with a first set of assets on the server.

45. The server device of claim 41 wherein the application is further configured to improve efficient utilization of memory capacity by prioritizing the second set of assets.

46. The server device of claim 41 wherein the second set of assets are grouped into a set of necessary assets and a set of preferred assets.

47. The server device of claim 41 wherein a geographic location of the mobile Internet-connected computing device determines the set of service related information to be transmitted, wherein the set of service related information includes service related information which is relative to and dependent on the geographic location of the mobile Internet-connected computing device.

48. The server device of claim 47 wherein as the geographic location of the mobile Internet-connected computing device changes, different service related information is presented within the application based on the geographic location.

49. The server device of claim 48 wherein the geographic location of the mobile Internet-connected computing device is determined using one or more cellular networks, GPS, GSM or other related technologies.

50. The server device of claim 41 wherein the information based on the geographic location utilizes past usage of a user in connection with the geographic location.

51. The server device of claim 41 wherein the server is located remotely from the mobile Internet-connected computing device.

52. The server device of claim 41 wherein the assets are prioritized by frequency of use by a user.

53. The server device of claim 41 wherein the assets are prioritized based on prior usage by a plurality of users.

54. The server device of claim 41 wherein the assets are prioritized based on user selected parameters.

55. The server device of claim 54 wherein the parameters are determined by a sponsor or advertiser of the consumer service.

56. The server device of claim 41 wherein the assets are prioritized by a service provider of the consumer service.

57. The server device of claim 41 wherein the assets are prioritized based on legal requirements at a current location of a user.

58. The server device of claim 41 wherein the assets are prioritized based on a user profile maintained on the server device.

59. The server device of claim 41 wherein the assets are delivered based on a current state of the consumer service.

60. The server device of claim 41 wherein the application is further configured to replace unused assets to manage memory on the mobile Internet-connected computing device.

61. The server device of claim 41 wherein the application is further configured to purge unused assets to manage memory on the mobile Internet-connected computing device.

62. A device comprising:
a memory configured to store an application, the application configured to:
load a set of service related information located on a server to an activity client;
select an option from the activity client from a list of available options;
download a set of service-specific information related to a selected option from the server to the device;
execute the application related to the selected option within the activity client on the device;
receive a list of assets necessary for executing the application from the server, wherein the assets necessary for executing the application directly affect the operation of the application;
compare the list of assets with a first set of assets on the device; and
receive only a second set of assets within the list of assets that are not already resident on the device; and
a processor configured to process the application.

63. The device of claim 62 wherein receiving only the second set of assets within the list of assets that are not already resident on the device is by determining a last activity participated in by the user or a genre of the last activity participated in by the user.

64. The device of claim 62 wherein the application is further configured for improving efficient utilization of memory capacity by prioritizing the second set of assets.

65. The device of claim 62 wherein the second set of assets are grouped into a set of necessary assets and a set of preferred assets.

66. The device of claim 62 wherein a geographic location of the mobile Internet-connected computing device determines the set of service related information to be loaded, wherein the set of service related information includes service related information which is relative to and dependent on the geographic location of the device.

67. The device of claim 66 wherein as the geographic location of the device changes, different service related information is presented within the application based on the geographic location.

68. The device of claim 67 wherein the geographic location of the device is determined using one or more cellular networks, GPS, GSM or other related technologies.

69. The device of claim 62 wherein the information based on the geographic location utilizes past usage of a user in connection with the geographic location.

70. The device of claim 62 wherein the server is located remotely from the mobile Internet-connected computing device.

71. The device of claim 62 wherein the assets are prioritized by frequency of use by a user.

72. The device of claim 62 wherein the assets are prioritized based on prior usage by a plurality of users.

73. The device of claim 62 wherein the assets are prioritized based on user selected parameters.

74. The device of claim 73 wherein the parameters are determined by a sponsor or advertiser of the consumer service.

75. The device of claim 62 wherein the assets are prioritized by a service provider of the consumer service.

76. The device of claim 62 wherein the assets are prioritized based on legal requirements at a current location of a user.

77. The device of claim 62 wherein the assets are prioritized based on a user profile maintained on the server.

78. The device of claim 62 wherein the assets are delivered based on a current state of the consumer service.

79. The device of claim 62 wherein the application is further configured to replace unused assets to manage memory on the mobile Internet-connected computing device.

80. The device of claim 62 wherein the application is further configured to purge unused assets to manage memory on the mobile Internet-connected computing device.

81. A method of implementing a consumer service with a server comprising:
    transmitting a set of service related information to an application on a mobile Internet-connected computing device;
    receiving additional information based on a user's execution of the application on the mobile Internet-connected computing device;
    transmitting a list of assets necessary to execute the application to the mobile Internet-connected computing device, wherein the assets necessary for executing the application directly affect the operation of the application; and
    transmitting to the mobile Internet-connected computing device only a second set of assets within the list of assets that are not already resident on the mobile Internet-connected computing device.

82. The method of claim 81 wherein transmitting only the second set of assets within the list of assets that are not already resident on the mobile Internet-connected computing device is by determining a last activity participated in by the user or a genre of the last activity participated in by the user.

83. The method of claim 81 further comprising comparing the list of assets with a first set of assets on the mobile Internet-connected computing device.

84. The method of claim 81 further comprising comparing the list of assets with a first set of assets on the server.

85. The method of claim 81 further comprising improving efficient utilization of memory capacity by prioritizing the second set of assets.

86. The method of claim 81 wherein the second set of assets are grouped into a set of necessary assets and a set of preferred assets.

87. The method of claim 81 wherein the geographic location of the mobile Internet-connected computing device determines the set of service related information to be transmitted, wherein the set of service related information includes service related information which is relative to and dependent on the geographic location of the mobile Internet-connected computing device.

88. The method of claim 87 wherein as the geographic location of the mobile Internet-connected computing device changes, different service related information is presented within the application based on the geographic location.

89. The method of claim 88 wherein the geographic location of the mobile Internet-connected computing device is determined using one or more cellular networks, GPS, GSM or other related technologies.

90. The method of claim 81 wherein the information based on the geographic location utilizes past usage of a user in connection with the geographic location.

91. The method of claim 81 wherein the server is located remotely from the mobile Internet-connected computing device.

92. The method of claim 81 wherein the assets are prioritized by frequency of use by a user.

93. The method of claim 81 wherein the assets are prioritized based on prior usage by a plurality of users.

94. The method of claim 81 wherein the assets are prioritized based on user selected parameters.

95. The method of claim 94 wherein the parameters are determined by a sponsor or advertiser of the consumer service.

96. The method of claim 81 wherein the assets are prioritized by a service provider of the consumer service.

97. The method of claim 81 wherein the assets are prioritized based on legal requirements at a current location of a user.

98. The method of claim 81 wherein the assets are prioritized based on a user profile maintained on the server.

99. The method of claim 81 wherein the assets are delivered based on a current state of the consumer service.

100. The method of claim 81 further comprising replacing unused assets to manage memory on the mobile Internet-connected computing device.

101. The method of claim 81 further comprising purging unused assets to manage memory on the mobile Internet-connected computing device.

102. A server device comprising:
    a memory configured to store an application, the application configured to:
        transmit a set of service related information to a mobile device application on a mobile Internet-connected computing device;
        receive additional information based on a user's execution of the mobile device application on the mobile Internet-connected computing device;
        transmit a list of assets necessary for executing the application to the mobile Internet-connected computing device, wherein the assets necessary for executing the application directly affect the operation of the application; and
        transmit to the mobile Internet-connected computing device only a second set of assets within the list of assets that are not already resident on the mobile Internet-connected computing device; and
    a processor configured to process the application.

103. The server device of claim 102 wherein only the second set of assets within the list of assets that are not already resident on the mobile Internet-connected computing device are transmitted by determining a last activity participated in by the user or a genre of the last activity participated in by the user.

104. The server device of claim 102 wherein the application is further configured to compare the list of assets with a first set of assets on the mobile Internet-connected computing device.

105. The server device of claim 102 wherein the application is further configured to compare the list of assets with a first set of assets on the server.

106. The server device of claim 102 wherein the application is further configured to improve efficient utilization of memory capacity by prioritizing the second set of assets.

107. The server device of claim 102 wherein the second set of assets are grouped into a set of necessary assets and a set of preferred assets.

108. The server device of claim 102 wherein a geographic location of the mobile Internet-connected computing device determines the set of service related information to be transmitted, wherein the set of service related information includes service related information which is relative to and dependent on the geographic location of the mobile Internet-connected computing device.

109. The server device of claim 108 wherein as the geographic location of the mobile Internet-connected computing device changes, different service related information is presented within the application based on the geographic location.

110. The server device of claim 109 wherein the geographic location of the mobile Internet-connected computing device is determined using one or more cellular networks, GPS, GSM or other related technologies.

111. The server device of claim 102 wherein the information based on the geographic location utilizes past usage of a user in connection with the geographic location.

112. The server device of claim 102 wherein the server is located remotely from the mobile Internet-connected computing device.

113. The server device of claim 102 wherein the assets are prioritized by frequency of use by a user.

114. The server device of claim 102 wherein the assets are prioritized based on prior usage by a plurality of users.

115. The server device of claim 102 wherein the assets are prioritized based on user selected parameters.

116. The server device of claim 115 wherein the parameters are determined by a sponsor or advertiser of the consumer service.

117. The server device of claim 102 wherein the assets are prioritized by a service provider of the consumer service.

118. The server device of claim 102 wherein the assets are prioritized based on legal requirements at a current location of a user.

119. The server device of claim 102 wherein the assets are prioritized based on a user profile maintained on the server.

120. The server device of claim 102 wherein the assets are delivered based on a current state of the consumer service.

121. The server device of claim 102 wherein the application is further configured to replace unused assets to manage memory on the mobile Internet-connected computing device.

122. The server device of claim 102 wherein the application is further configured to purge unused assets to manage memory on the mobile Internet-connected computing device.

123. A mobile Internet-connected computing device comprising:
- a memory configured to store an application, the application configured to:
  - load a set of service related information located on a server to an activity client;
  - execute the application related to a selected option within the activity client on the mobile Internet-connected computing device;
  - receive a list of assets necessary for executing the application from the server, wherein the assets necessary for executing the application directly affect the operation of the application;
  - compare the list of assets with a first set of assets on the mobile Internet-connected computing device; and
  - receive only a second set of assets within the list of assets that are not already resident on the mobile Internet-connected computing device; and
- a processor configured to process the application.

124. The device of claim 123 wherein receiving only the second set of assets within the list of assets that are not already resident on the mobile Internet-connected computing device is by determining a last activity participated in by the user or a genre of the last activity participated in by the user.

125. The device of claim 123 wherein the application is further configured for improving efficient utilization of memory capacity by prioritizing the second set of assets.

126. The device of claim 123 wherein the second set of assets are grouped into a set of necessary assets and a set of preferred assets.

127. The device of claim 123 wherein a geographic location of the mobile Internet-connected computing device determines the set of service related information to be loaded, wherein the set of service related information includes service related information which is relative to and dependent on the geographic location of the mobile Internet-connected computing device.

128. The device of claim 127 wherein as the geographic location of the mobile Internet-connected computing device changes, different service related information is presented within the application based on the geographic location.

129. The device of claim 128 wherein the geographic location of the mobile Internet-connected computing device is determined using one or more cellular networks, GPS, GSM or other related technologies.

130. The device of claim 123 wherein the information based on the geographic location utilizes past usage of a user in connection with the geographic location.

131. The device of claim 123 wherein the server is located remotely from the mobile Internet-connected computing device.

132. The device of claim 123 wherein the assets are prioritized by frequency of use by a user.

133. The device of claim 123 wherein the assets are prioritized based on prior usage by a plurality of users.

134. The device of claim 123 wherein the assets are prioritized based on user selected parameters.

135. The device of claim 134 wherein the parameters are determined by a sponsor or advertiser of the consumer service.

136. The device of claim 123 wherein the assets are prioritized by a service provider of the consumer service.

137. The device of claim 123 wherein the assets are prioritized based on legal requirements at a current location of a user.

138. The device of claim 123 wherein the assets are prioritized based on a user profile maintained on the server.

139. The device of claim 124 wherein the assets are delivered based on a current state of the consumer service.

140. The device of claim 125 wherein the application is further configured to replace unused assets to manage memory on the mobile Internet-connected computing device.

141. The device of claim 126 wherein the application is further configured to purge unused assets to manage memory on the mobile Internet-connected computing device.

142. The method of claim 1 wherein the second set of assets are prioritized based on an amount of time remaining before a start of an event.

143. The method of claim 20 wherein the second set of assets are prioritized based on an amount of time remaining before a start of an event.

144. The server device of claim 41 wherein the second set of assets are prioritized based on an amount of time remaining before a start of an event.

145. The device of claim 62 wherein the second set of assets are prioritized based on an amount of time remaining before a start of an event.

146. The method of claim 81 wherein the second set of assets are prioritized based on an amount of time remaining before a start of an event.

147. The server device of claim 102 wherein the second set of assets are prioritized based on an amount of time remaining before a start of an event.

148. The device of claim 123 wherein the second set of assets are prioritized based on an amount of time remaining before a start of the first event or the second event.

* * * * *